(12) United States Patent
Lee et al.

(10) Patent No.: US 11,310,749 B2
(45) Date of Patent: Apr. 19, 2022

(54) TRANSMIT POWER CONTROL APPARATUS AND METHOD IN MULTI-RAT DUAL CONNECTIVITY BASED ON OVERLAP OF MASTER AND SECONDARY NODE TRANSMISSIONS

(71) Applicant: Samsung Electronics Co., Ltd., Suwon-si (KR)

(72) Inventors: Hyoungjoo Lee, Suwon-si (KR); Sangho Lee, Suwon-si (KR); Euichang Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 90 days.

(21) Appl. No.: 16/821,226

(22) Filed: Mar. 17, 2020

(65) Prior Publication Data
US 2020/0305091 A1    Sep. 24, 2020

(30) Foreign Application Priority Data
Mar. 22, 2019 (KR) .......................... 10-2019-0032738

(51) Int. Cl.
*H04W 52/36* (2009.01)
*H04W 52/02* (2009.01)
(Continued)

(52) U.S. Cl.
CPC ........ *H04W 52/365* (2013.01); *H04B 7/2043* (2013.01); *H04W 52/0212* (2013.01);
(Continued)

(58) Field of Classification Search
CPC ..... H04W 88/06; H04W 76/15; H04W 76/27; H04W 52/146; H04W 36/0069;
(Continued)

(56) References Cited

U.S. PATENT DOCUMENTS

| 2016/0028585 A1 | 1/2016 | Wager et al. |
| 2016/0255593 A1 | 9/2016 | Blankenship et al. |
| 2019/0104476 A1* | 4/2019 | Lim .................... H04W 52/367 |

FOREIGN PATENT DOCUMENTS

| JP | 2017-521008 A | 7/2017 |
| KR | 10-1788479 B1 | 10/2017 |

OTHER PUBLICATIONS

International Search Report dated Jul. 2, 2020, issued in an International Application No. PCT/KR2020/003861.
(Continued)

*Primary Examiner* — Philip Sobutka
(74) *Attorney, Agent, or Firm* — Jefferson IP Law, LLP

(57) ABSTRACT

An apparatus and method for controlling transmit power of an electronic device in a wireless communication system are provided. A proposed method for a base station as a master node of an electronic device in an evolved universal terrestrial radio access (E-UTRA) new radio (NR) dual connectivity (EN-DC) environment to communicate with the electronic device via a first radio access technology (RAT) in a first band includes performing a random access procedure with the electronic device, inquiring and receiving electronic device capability information from the electronic device, determining whether to add a secondary node supporting communication with the electronic device via a second RAT in a second band that is different from the first band, and transmitting an updated power allocation value to the electronic device along with a secondary node addition command based on the electronic device capability information indicating that the electronic device does not support dynamic power sharing, the update power allocation value being set based on the electronic device capability information and uplink power information for transmission to the second node.

20 Claims, 17 Drawing Sheets

(51) Int. Cl.
*H04B 7/204* (2006.01)
*H04W 76/27* (2018.01)
*H04W 52/14* (2009.01)
*H04W 74/00* (2009.01)

(52) U.S. Cl.
CPC ..... *H04W 52/0225* (2013.01); *H04W 52/146* (2013.01); *H04W 52/367* (2013.01); *H04W 74/004* (2013.01); *H04W 76/27* (2018.02)

(58) Field of Classification Search
CPC ............. H04W 52/38; H04W 74/0833; H04W 74/004; H04W 88/08; H04W 52/34; H04W 52/0212; H04W 52/0225; H04W 52/365; H04W 52/367; H04B 7/2043; Y02D 30/70
USPC ........................................................ 455/522
See application file for complete search history.

(56) References Cited

OTHER PUBLICATIONS

Huawei et al., TP for power control for EN-DC in TS38.213, R1-1801803, 3GPP TSG RAN WG1 Meeting #92, Feb. 17, 2018, Athens, Greece.
Intel Corp., Further discussion on NR-LTE co-existence, R1-1812474, 3GPP TSG-RAN WG1 Meeting #95, Nov. 3, 2018, Spokane, USA.
Ericsson, Unification of EN-DC terminology, R2-1902537, GPP TSG-RAN2 Meeting #105, Mar. 1, 2019, Athens, Greece.

* cited by examiner

FIG. 5A

| Uplink-Downlink Configuration | Downlink-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5ms | D | S | U | U | U | D | S | U | U | U |
| 1 | 5ms | D | S | U | U | D | D | S | U | U | D |
| 2 | 5ms | D | S | U | D | D | D | S | U | D | D |
| 3 | 10ms | D | S | U | U | U | D | D | D | D | D |
| 4 | 10ms | D | S | U | U | D | D | D | D | D | D |
| 5 | 10ms | D | S | U | D | D | D | D | D | D | D |
| 6 | 5ms | D | S | U | U | U | D | S | U | U | D |

TRANSMIT POWER CONTROL APPARATUS AND METHOD IN MULTI-RAT DUAL CONNECTIVITY BASED ON OVERLAP OF MASTER AND SECONDARY NODE TRANSMISSIONS

CROSS-REFERENCE TO RELATED APPLICATION(S)

This application is based on and claims priority under 35 U.S.C. § 119(a) of a Korean patent application number 10-2019-0032738, filed on Mar. 22, 2019, in the Korean Intellectual Property Office, the disclosure of which is incorporated by reference herein in its entirety.

BACKGROUND

1. Field

The disclosure relates to an apparatus and method for controlling transmit power of an electronic device in a wireless communication system.

2. Description of Related Art

The $3^{rd}$ Generation Partnership Project (3GPP), as a cellular mobile communication standardization organization, is developing a $5^{th}$ Generation (5G) new radio (NR) access technology (3GPP NR) to achieve a data rate higher than that of a legacy $4^{th}$ generation (4G) long-term evolution (LTE) radio access technology. The 3GPP NR is being developed in two types. The first type is directed to an electronic device that is capable of access to only the NR network. The second type is directed to an electronic device that is capable of access to the legacy 4G LTE and 5G NR networks. The electronic device that is capable of access to both the legacy 4G LTE and 5G NR networks may be able to communicate via the legacy 4G LTE and 5G NR networks.

The above information is presented as background information only to assist with an understanding of the disclosure. No determination has been made, and no assertion is made, as to whether any of the above might be applicable as prior art with regard to the disclosure.

SUMMARY

A network environment in which two networks (e.g., first and second networks) supporting different radio access technologies (RATs) coexist is referred to as a multi-RAT dual connectivity (MR-DC) environment. For example, an MR-DC environment may be produced with an LTE network as the first network and an NR network as the second network. Examples of the network environment in which the LTE and NR networks coexist may include evolved universal terrestrial radio access (E-UTRA) NR dual connectivity (EN-DC) and NR E-UTRA dual (NE-DC) connectivity. In the MR-DC environment, an electronic device may access the NR network (or LTE network) in the state of being connected to an LTE network (or NR network). The MR-DC is similar to the dual connectivity specified for LTE networks. In the case where an electronic device is simultaneously connected to both the LTE and 5G network for communication, the transmit power of the electronic device may be appropriately shared between the LTE and 5G networks. However, there may be an electronic device that cannot have simultaneous connections to both the LTE and 5G networks, and even electronic devices capable of simultaneously connecting to both the LTE and 5G networks may be configured to avoid simultaneous access to the LTE and 5G networks depending on the situation. Accordingly, there is a need of a method for an electronic device to control the transmit power of the electronic device.

Aspects of the disclosure are to address at least the above-mentioned problems and/or disadvantages and to provide at least the advantages described below. Accordingly, as aspect of the disclosure is to provide an apparatus and method for efficiently managing the transmit power of an electronic device in an MR-DC environment.

Another aspect of the disclosure is to provide a transmit power management apparatus and method of an electronic device that is capable of improving transmission efficiency of the electronic device in an MR-DC environment.

Another aspect of the disclosure is to provide a transmit power efficiency-adaptive network access apparatus and method of an electronic device in an MR-DC environment.

Additional aspects will be set forth in part in the description which follows and, in part, will be apparent from the description, or may be learned by practice of the presented embodiments.

In accordance with an aspect of the disclosure, a transmit power control method of an electronic device connected to a master node via a first radio access technology (RAT) and to a secondary node via a second RAT for communication in a multi-RAT dual connectivity (MR-DC) environment is provided. The transmit power control method includes receiving a first uplink maximum transmit power value allowed for transmission to the master node from the master node and storing the first uplink maximum transmit power value, generating and transmitting electronic device capability information in response to an electronic device capability information inquiry received from the master node, the electronic device capability information comprising information indicating whether the electronic device supports MR-DC and information indicating whether the electronic device supports dynamic power sharing in the MR-DC environment, receiving a secondary node addition command message from the master node in the state of being connected to the master node, receiving a second uplink maximum transmit power value allowed for the secondary node from the secondary node in the state of being connected to the master node and storing the second uplink maximum transmit power, determining, in a situation of communicating simultaneously with the master and secondary nodes, a first transmit power for transmission over the second uplink based on the second uplink maximum transmit power value in a first time period during which a duration for uplink data transmission to the master node and a duration for uplink data transmission to the secondary node are not overlapped, and determining, in a situation where a sum of the first and second uplink maximum transmit power values is equal to or less than a maximum allowed uplink transmit power value of the electronic device, a second transmit power for transmission over the second uplink based on the second uplink maximum transmit power value in a second time period during which the duration for uplink data transmission to the master node and the duration for uplink data transmission to the secondary node are overlapped.

In accordance with another aspect of the disclosure, a method for a base station as a master node of an electronic device in an E-UTRA NR dual connectivity (EN-DC) environment to communicate with the electronic device via a first radio access technology (RAT) in a first band is provided. The method includes performing a random access procedure with the electronic device, inquiring and receiving electronic device capability information from the electronic device, determining whether to add a secondary node supporting communication with the electronic device via a second RAT in a second band that is different from the first band, and transmitting an updated power allocation value to the electronic device along with a secondary node addition command based on the electronic device capability information indicating that the electronic device does not support dynamic power sharing, the update power allocation value being set based on the electronic device capability information and uplink power information for transmission to the second node.

In accordance with another aspect of the disclosure, an electronic device is provided. The electronic device includes a housing, at least one radio frequency integrated circuit (RFIC) arranged in the housing and configured to support a first radio access technology (RAT) and a second RAT, a first communication processor electrically or functionally connected to the at least one RFIC, a second communication processor electrically or functionally connected to the at least one RFIC and the first communication processor, and a memory configured to store instructions, executable by the first communication processor, for receiving a first uplink maximum transmit power value allowed for transmission to the master node from the master node and storing the first uplink maximum transmit power value in the memory, generating and transmitting electronic device capability information in response to an electronic device capability information inquiry received from the master node, the electronic device capability information comprising information indicating whether the electronic device supports MR-DC and information indicating whether the electronic device supports dynamic power sharing in the MR-DC environment, receiving a secondary node addition command message from the master node in the state of being connected to the master node, instructing the second communication processor to establish a connection to a secondary node via the second RAT upon receipt of the secondary node addition command message, determining a first transmit power value of the at least one RFIC in association with the first RAT based on the first uplink maximum transmit power, providing the first transmit power value of the at least one RFIC that is determined in association with the first RAT to the second communicating processor, and instructions, executable by the second communication processor, for receiving a second uplink maximum transmit power value allowed for transmission to the secondary node from the secondary node and storing the second uplink maximum transmit power value in the memory, establishing a connection to the secondary node in response to the secondary node addition command from the master node, determining, in a situation of transmitting uplink data to the secondary node, a first transmit power for transmission over the second uplink based on the second uplink maximum transmit power value in a first time period during which a duration for uplink data transmission to the master node and a duration for uplink data transmission to the secondary node are not overlapped, and determining, in a situation where a sum of the first and second uplink maximum transmit power values is equal to or less than a maximum allowed uplink transmit power value of the electronic device, a second transmit power for transmission over the second uplink based on the second uplink maximum transmit power value in a second time period during which the duration for uplink data transmission to the master node and the duration for uplink data transmission to the secondary node are overlapped.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5A is a diagram for explaining uplink-downlink configurations in an LTE network according to an embodiment of the disclosure;

The same reference numerals are used to represent the same elements throughout the drawings.

DETAILED DESCRIPTION

Figure 1:
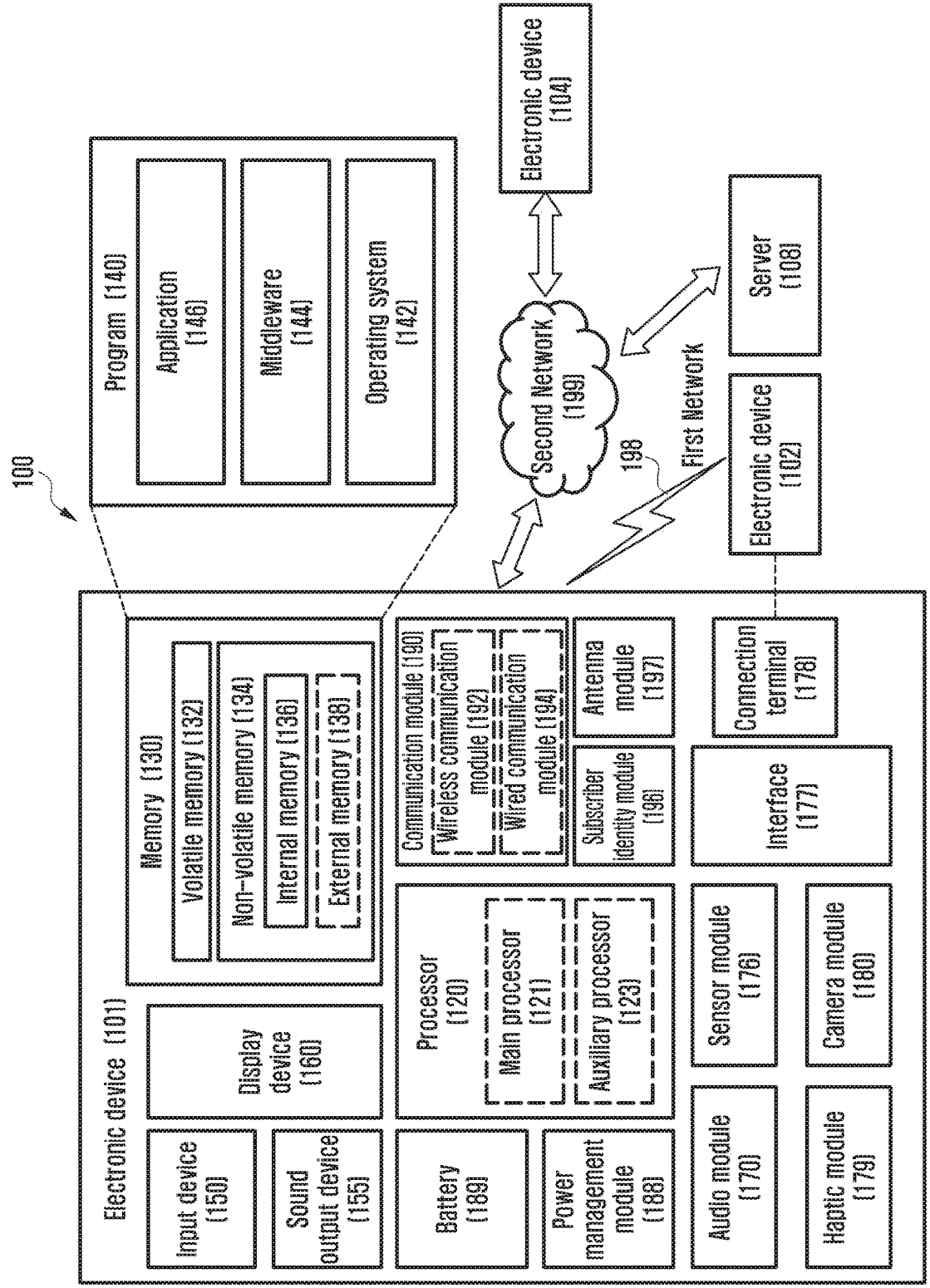
FIG. 1 is a block diagram illustrating an electronic device in a network environment according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. The antenna module may be formed with a conductor or conductor pattern according to an embodiment, and it may further include other components (e.g., RFIC) in addition to the conductor or conductor pattern according to an alternative embodiment. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
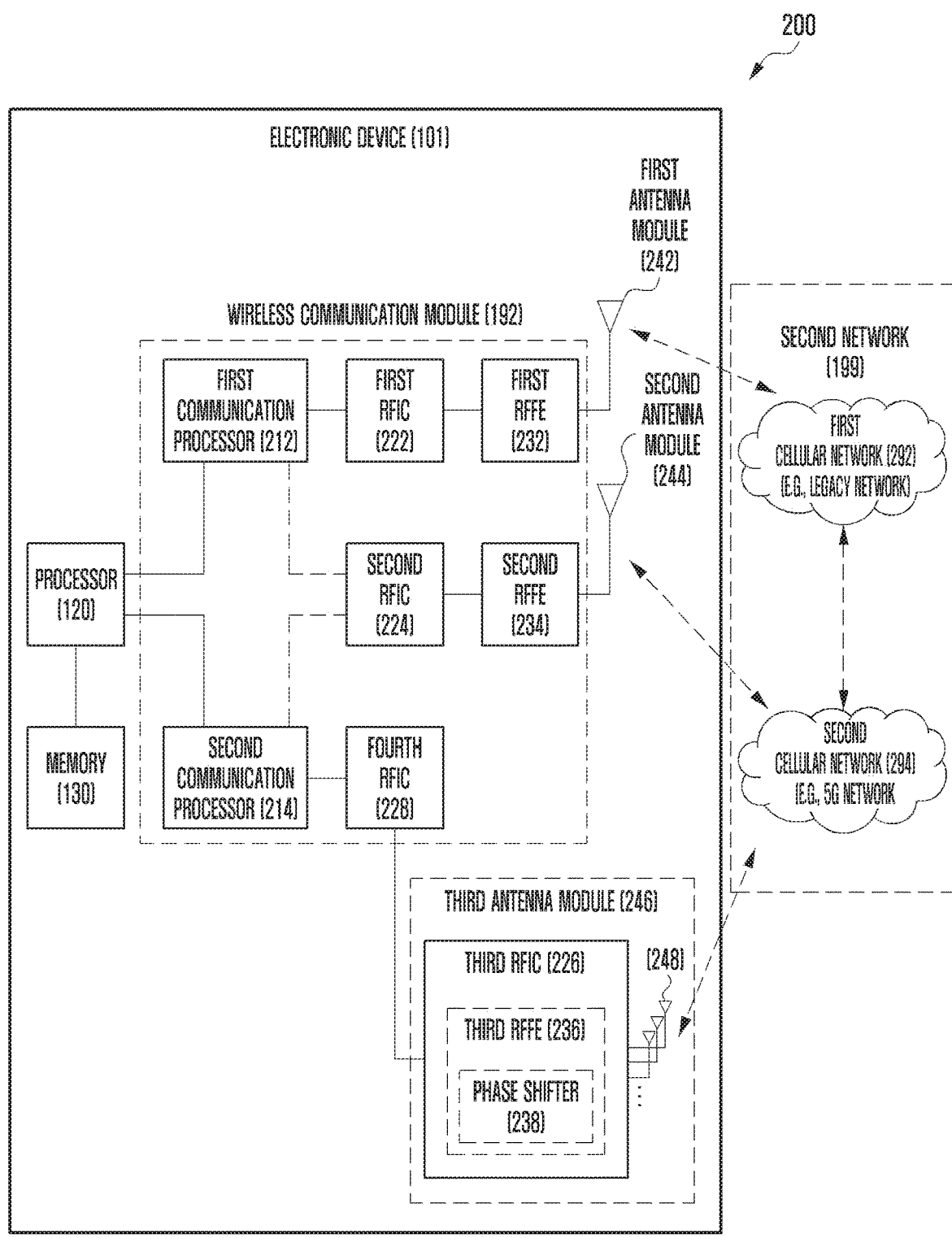
FIG. 2 is a block diagram of an electronic device in a network environment including multiple cellular networks according to an embodiment of the disclosure.

FIG. 2 is a block diagram 200 of an electronic device 101 in a network environment including multiple cellular networks according to an embodiment of the disclosure.

Referring to FIG. 2, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include a processor 120 and a memory 130. The second network 199 may include a first cellular network 292 and a second cellular network 294. According to an alternative embodiment, the electronic device 101 may further include at least one of the components described with reference to FIG. 1, and the second network 199 may include at least one other network. According to an embodiment, the first communication processor 212, the second communication processor 214, the first RFIC 222, the second RFIC 224, the fourth RFIC 228, the first RFFE 232, and the second RFFE 234 may constitute at least part of the radio communication module 192. Accordingly an alternative embodiment, the fourth RFIC 228 may be omitted or constitute part of the third RFIC 226.

The first communication processor 212 may establish a communication channel within a band designated to the first cellular network 292 and support a legacy network communication on the established communication channel. According to various embodiments, the first cellular network may be a legacy network such as a 2nd generation (2G), $3^{rd}$ generation (3G), or 4G (or LTE) network. The second communication processor 214 may establish a communication channel in a designated band (e.g., about 6 gigahertz (GHz)~about 60 GHz) among bands for radio communication with the second cellular network and support 5G network communication on the established communication channel According to various embodiments, the second cellular network 294 may be a 5G network defined by 3GPP. Additionally, according to an embodiment, the first communication processor 212 or the second communication processor 214 may establish a communication channel in another designated band (e.g., below 6 GHz) among bands for radio communication with the second cellular network 249 and support 4G network communication on the established communication channel According to an embodiment, the first and second communication processors 212 and 214 may be implemented in the form of a single chip or a single package. According to various embodiments, the first communication processor 212 or the second communication processor 214 may be implemented along with the processor 220, the auxiliary processor 223, or the communication module 290 in a single chip or a single package. According to an embodiment, the first and second communication processor 212 and 214 may be connected with each other directly through an interface (not shown) or indirectly to transmit/receive data or control signals in a unidirectional or bidirectional manner.

For transmission, the first RFIC 222 may convert a baseband signal generated by the first communication processor 212 to a radio frequency (RF) signal in the range from about 700 megahertz (MHz) to about 3 GHz for the first cellular network 292 (e.g., legacy network). For reception, an RF signal from the first cellular network 292 (e.g., legacy network) may be received by an antenna (e.g., first antenna module 242) and preprocessed by an RFFE (e.g., first RFFE 232). The first RFIC 222 may convert the preprocessed RF signal to a baseband signal that can be processed by the first communication processor 212.

For transmission, the second RFIC 224 may convert the baseband signal generated by the first communication processor 212 or the second communication processor 214 to an RF signal for use in the second cellular network (hereinafter, referred to as Sub6 RF signal). For reception, a 5G Sub6 RF signal from the second cellular network 294 (e.g., 5G network) may be received by an antenna (e.g., second antenna module 244) and preprocessed by an RFFE (e.g., second RFFE 234). The second RFIC 224 may convert the preprocessed 5G Sub6 RF signal to a baseband signal that can be processed by one of the first and second communication processor 212 and 214.

The third RFIC 226 may convert the baseband signal generated by the second communication processor 214 to an RF signal of a 5G Above6 band (e.g., about 6 GHz~about 60 GHz) (hereinafter, 5G Above6 RF signal) for use in the second cellular network 294 (e.g., 5G network). For reception, a 5G Above6 RF signal from the second cellular network 294 (e.g., 5G network) may be received by an antenna (e.g., antenna 248) and preprocessed by the third RFFE 236. The third RFIC 226 may convert the preprocessed 5G Above6 RF signal to a baseband signal that can be processed by the second communication processor 214. According to an embodiment, the third RFFE 236 may constitute part of the third RFIC 226.

According to an embodiment, the electronic device 201 may include the fourth RFIC 228 formed independently of or as at least part of the third RFIC 226. In this case, the fourth RFIC 228 may convert the baseband signal generated by the second communication processor 214 to an intermediate frequency (IF) band (e.g., about 9 GHz~about 11 GHz) signal (hereinafter, referred to as IF signal) and send the IF signal to the third RFIC 226. The third RFIC 226 may convert the IF signal to a 5G Above6 RF signal. For reception, a 5G Above6 RF signal from the second cellular network 294 (e.g., 5G network) may be received by an antenna (e.g., antenna 248) and converted to an IF signal by the third RFIC 226. The fourth RFIC 228 may convert the IF signal to a baseband signal that can be processed by the second communication processor 214.

According to an embodiment, the first and second RFICs 222 and 224 may constitute at least part of a single chip or a signal package. According to an embodiment, the first and second RFFEs 232 and 234 may constitute at least part of a single chip or a single package. According to an embodiment, at least one of the first and second antenna modules 242 and 244 may be omitted or combined with another antenna module to process RF signals in the corresponding bands.

According to an embodiment, the third RFIC 226 and the antenna 248 may be arranged on the same substrate as the third antenna module 246. For example, the wireless communication module or the processor 220 may be arranged on a first substrate (e.g., main printed circuit board (PCB)). In this case, the third antenna module 246 may be formed in such a way of arranging the third RFIC 226 at a region (e.g., bottom surface) of a second substrate (e.g., sub PCB) in separation from the first substrate and the antenna 248 at another region (e.g., top surface) of the second substrate. By arranging the first RFIC 222 and the antenna 248 on the same substrate, it may be possible to reduce the length of a transmission line between the first RFIC 222 and the antenna 248. This makes it possible to reduce loss (attenuation) of signals in a high frequency band (e.g., about 6 GHz~about 60 GHz) for 5 network communication on the transmission line. This means that the electronic device 201 can improve the quality and speed of communication with the second cellular network 294 (e.g., 5G network).

According to an embodiment, the antenna 248 may be configured in the form of an antenna array including a plurality of antenna elements for beamforming. In this case, the third RFIC 226 may include, as part of the third RFFE 236, a plurality of phase shifters 238 corresponding to the antenna elements. For transmission, each phase shifter 238 may shift the phase of a 5G Above6 RF signal to be transmitted to the outside (e.g., 5G network base station) of the electronic device 201 via a corresponding antenna element. For reception, the phase shifters 238 may shift the phases of 5G Above6 RF signals received from the outside via corresponding antenna elements so as to be identical or substantially identical with each other. This makes it possible for the electronic device to perform beamforming for transmitting and receiving signals to and from the outside.

The second cellular network 294 (e.g., 5G network) may operate independently of (e.g., standalone (SA)) or in association with (e.g., non-standalone (NSA)) the first cellular network 292 (e.g., legacy network). For example, a 5G network may include access networks (e.g., 5G radio access networks (RANs) or next generation RANs (NG RANs)) with the exception of a core network (e.g., N core). In this case, the electronic device 201 may access the 5G RAN to connect to an external network (e.g., Internet) under the control of a core network of a legacy system (e.g., evolved packet core (EPC)). The protocol information for communication with the legacy network (e.g., LTE protocol information) and the protocol information for communication with the 5 network (e.g., New Radio (NR) protocol information) may be stored in the memory 230 such that other components (e.g., processor 220, first communication processor 212, or second communication processor 214) can access the information.

Figure 3A:
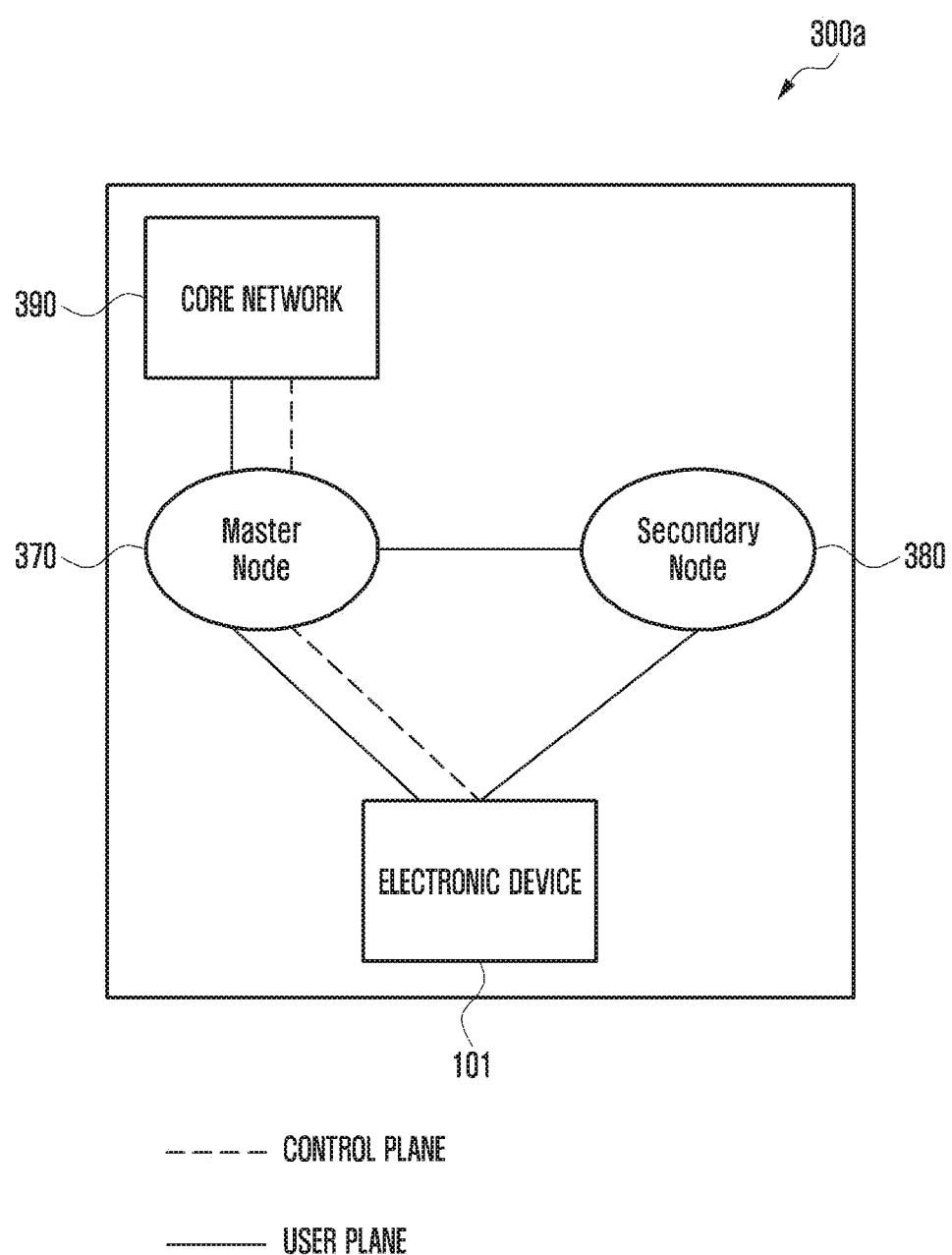
FIGS. 3A, 3B, and 3C are diagrams illustrating network architectures for legacy and/or 5G wireless communication systems according to various embodiments of the disclosure.
Figure 3B:
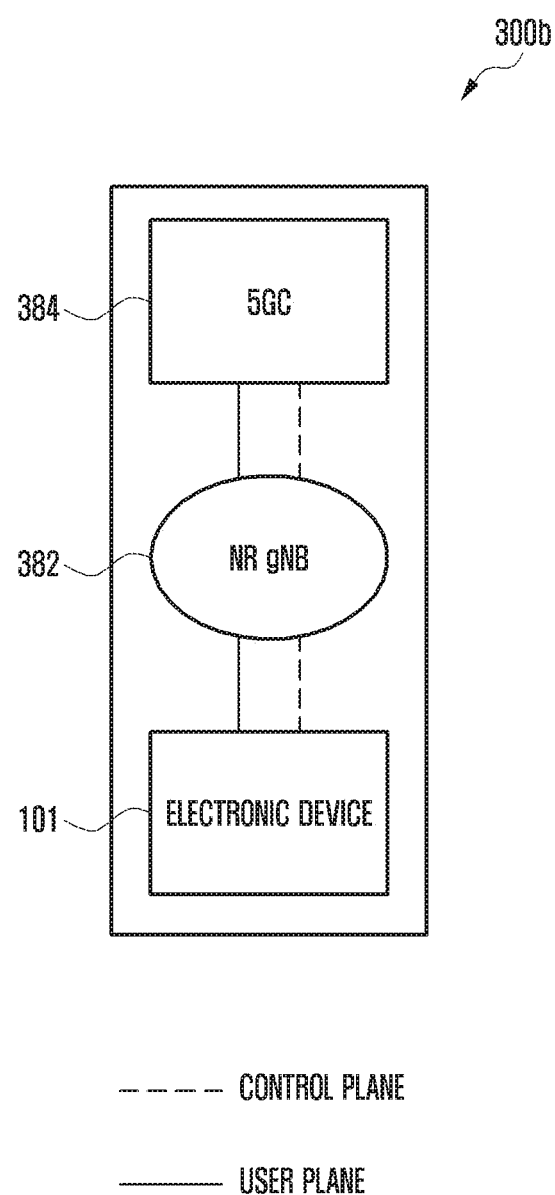
Figure 3C:
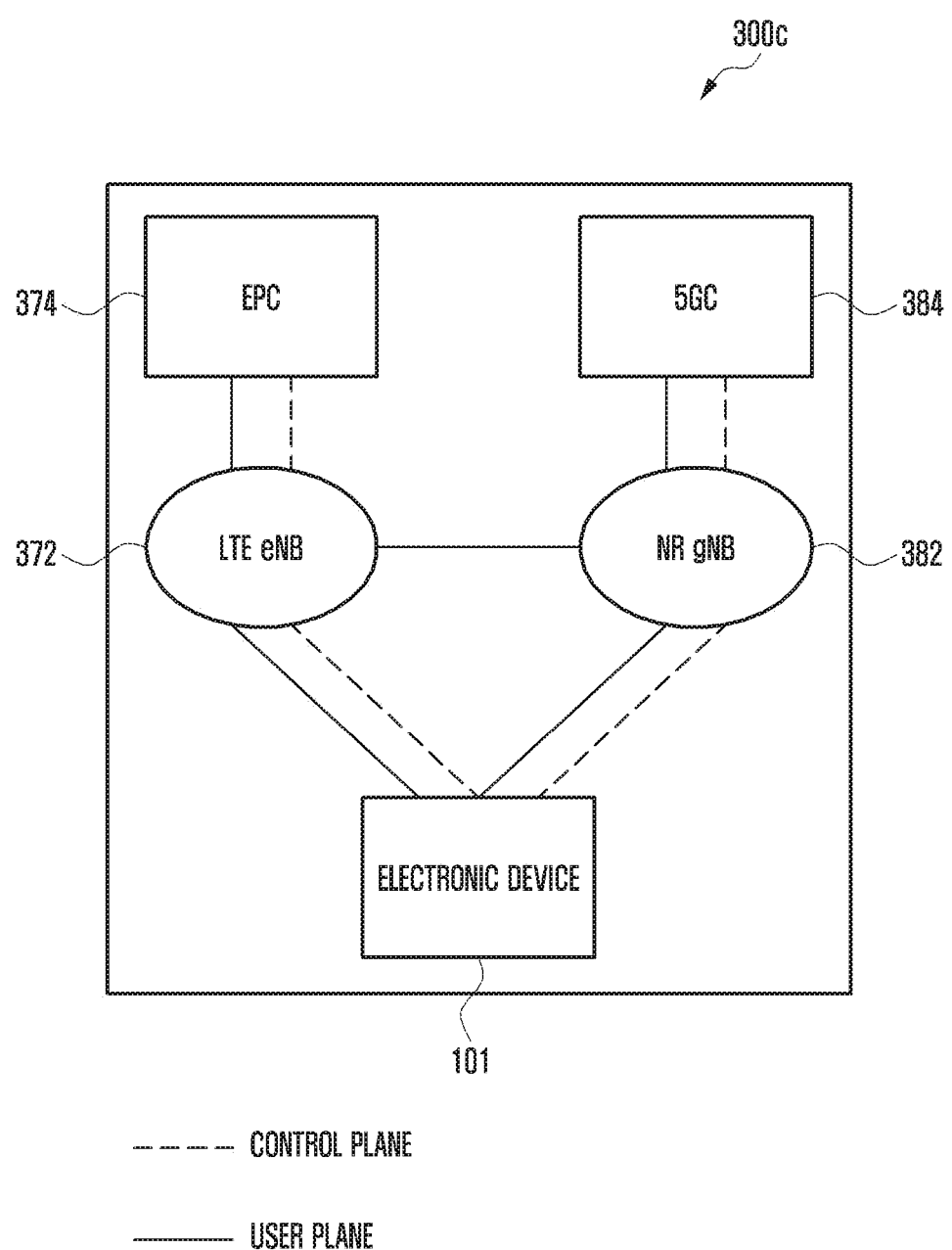

FIGS. 3A to 3C are diagrams illustrating network architectures for legacy and/or 5G wireless communication systems according to various embodiments of the disclosure.

Referring to FIGS. 3A to 3C, each of network environments 300a, 300b, and 300c includes at least one of a legacy network and a 5G network. For example, the legacy network may include a 3GPP 4G (or LTE) base station (e.g., eNodeB (eNB)) responsible for radio access of an electronic device 101 and an evolved packet core (EPC) 374 for 4G communication systems. For example, the 5G network may include a new radio (NR) base station 382 (e.g., gNodeB (gNB)) responsible for radio access of the electronic device 101 and a 5G core (5GC) 384 for 5G communication systems.

According to various embodiments, the electronic device 101 may transmit and/or receive control messages and user data via legacy communication and/or 5G communication. For example, the control messages may include at least one of security control, bearer setup, authentication, registration, and mobility management messages. For example, the user data may be the data excluding control messages being exchanged between the electronic device 101 and the core network 390 (e.g., EPC 374).

Referring to FIG. 3A, the electronic device 101 may communicate at least one of control messages or user data with at least part of a 5G network (e.g., NR gNB 382 and 5GC 384) via at least part of the legacy network (e.g., LTE eNB 372 and EPC 374).

According to various embodiments, the network environment 300a may include a network environment for supporting wireless dual connectivity (DC) to the LTE eNB 372 and the NR gNB 382 and communicating control messages with the electronic device 101 via one of the EPV 374 or the 5GC 384.

According to various embodiments, one of the LTE eNB 372 and or the NR gNB 382 may operate as a master node (MN) 370 and the other may operate as a secondary node (SN) 380 in a wireless DC environment. The MN 370 may connect to the core network 390 to transmit and/or receive a control message. The MN 370 and the SN 380 may communicate radio resource (e.g., communication channel) management messages via a network interface.

According to various embodiments, the MN 370 may be the LTE eNB 372, the SN 380 may be the NR gNB 382, and the core network 390 may be the EPC 374. In this case, the electronic device 101 may transmit and/or receive a control message via the LTE eNB 372 and the EPC 374 and user data via the LTE eNB 372 and the NR gNB 382.

According to various embodiments, the MN 370 may be the NR gNB 382, the SN 380 may be the LTE eNB 372, and the core network 390 may be the 5GC 384. In this case, the electronic device 101 may transmit and/or receive a control message via the LTE eNB 372 and the EPC 374 and user data via the LTE eNB 372 and the NR gNB 382.

Referring to FIG. 3B, the 5G network may include the NR gNB 382 and the 5GC 384 and communicate control messages and user data with the electronic device 101 in a standalone manner.

Referring to FIG. 3C, the legacy network and 5G network may communicate data with the electronic device 101 independently of each other. In this case, the electronic device 101 and the EPC 374 may communicate control messages and user data via the LTE eNB 372. Meanwhile, the electronic device 101 and the 5GC 384 may communicate control messages and user data via the NR gNB 382.

According to various embodiments, the electronic device 101 may be registered with at least one of the EPC 374 and the 5GC to transmit and/or receive a control message.

According to various embodiments, the EPC 374 and the 5GC 384 may interwork for managing a communication session of the electronic device 101. For example, the mobility information of the electronic device 101 may be transmitted and/or received through the interface formed between the EPC 374 and the 5GC 384.

Figure 3D:
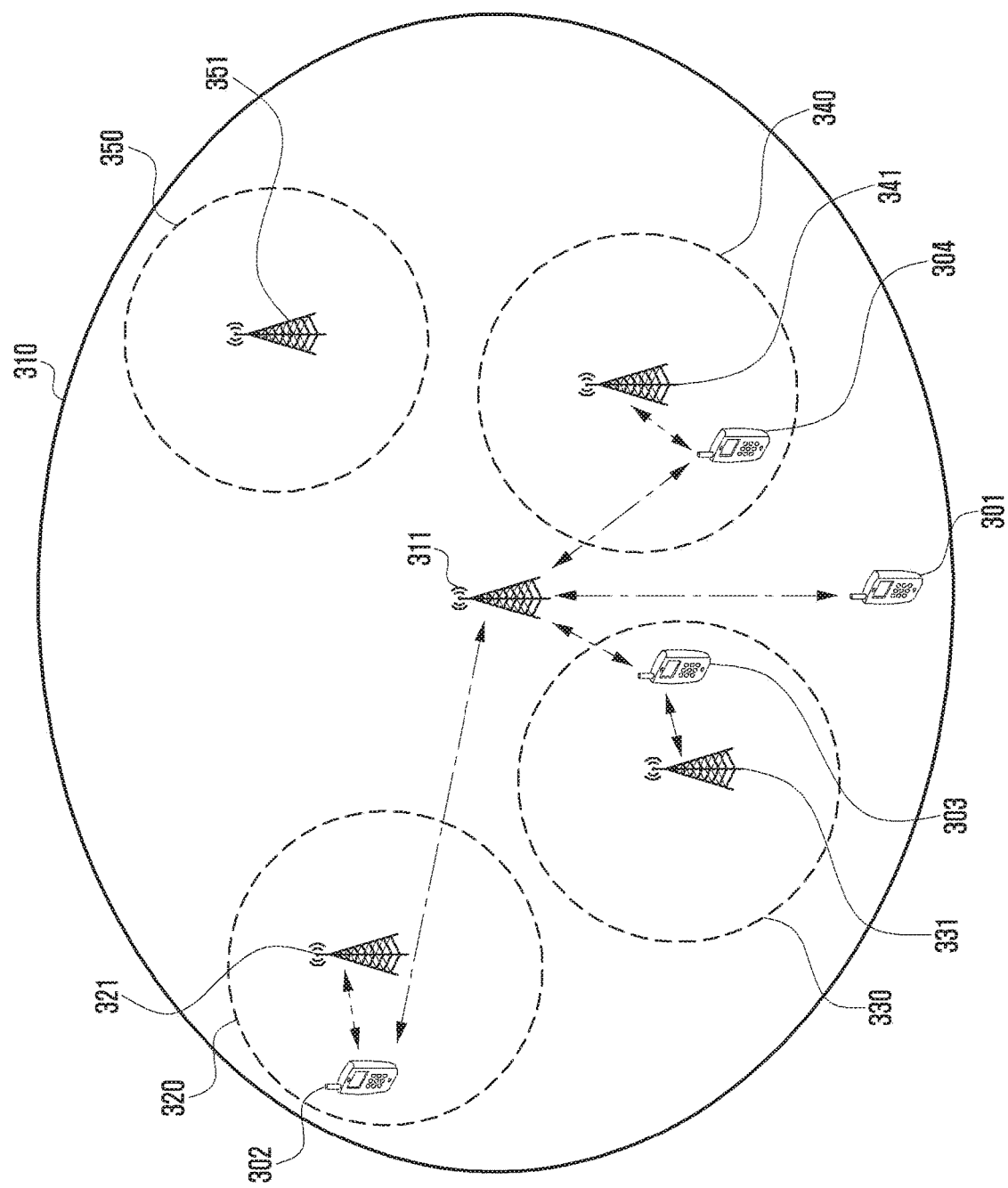
FIG. 3D is a diagram illustrating a network environment in which LTE and NR base stations responsible for radio access of electronic devices coexist according to an embodiment of the disclosure.

FIG. 3D is a diagram illustrating a network environment in which LTE and NR base stations 311, 321, 331, 341, and 351 responsible for radio access of electronic devices 301, 302, 303, and 304 coexist according to an embodiment of the disclosure.

Referring to FIG. 3D, a plurality of base stations 311, 321, 331, 341, and 351 are depicted. According to an embodiment, the first base station 311 may have a coverage area 310 larger than that of each of the other base stations 321, 331, 341, and 351. The first base station 311 of which the coverage area 310 is larger than that of each of the other base stations 321, 331, 341, and 351 may become a master node (e.g., master node 370 in FIG. 3A), e.g., an LTE eNB. According to various embodiments, the other base stations 321, 331, 341, and 351 may become secondary nodes (e.g., secondary node 380 in FIG. 3A), e.g., 5G gNBs. Typically, an LTE eNB operates on a frequency lower than that on which a 5G gNB operates. According to an embodiment, the first base station 311 as an LTE eNB may operate on a radio frequency (RF) in the range from about 700 MHz to about 3 GHz. According to an embodiment, the 5G gNBs 321, 331, 341, and 351 may operate in a first radio frequency band of the range from about 6 GHz to about 60 GHz and a second radio frequency band below 6 GHz. Because the first base station 311, i.e., the LTE eNB, operates in a frequency band lower than that in which the 5G gNBs 321, 331, 341, and 351 operate, the coverage area 310 of the first base station 311, i.e., the LTE eNB, is likely to be larger than that of each of the NR gNBs 321, 331, 341, and 351.

Referring to FIG. 3D, four electronic devices 301, 302, 303, and 304 are depicted. Each of the four electronic devices 301, 302, 303, and 304 may be configured with all or at least some of the components of the electronic device 101 exemplified in FIGS. 1 and 2. According to an embodiment, the four electronic devices 301, 302, 303, and 304 are all located within the first coverage area 310 of the first base station 311 and thus can communicate with the first base station 311, i.e., LTE eNB. According to an embodiment, if each of the four electronic devices 301, 302, 303, and 304 is also located within a coverage areas (310, 320, 330, 340 and 350) of one of the 5G gNBs 321, 331, 341, and 351, the electronic devices may be able to communicate with the corresponding 5G gNB.

According to an embodiment, the electronic device 301 is located within the first coverage area 310 of the first base station 311 that is not overlapped with any of the coverage areas of the 5G gNBs 321, 331, 341, and 351. In this case, the first electronic device 301 may be able to communicate only with the first base station 3110 in an LTE mode.

According to an embodiment, the second electronic device 302 may be located within the first coverage area 310 of the first base station 311 and simultaneously within a second coverage 320 of the second base station 321 as a 5G gNB. In this case, the second electronic device 302 may communicate with the first base station 311 as the LTE eNB in the LTE mode and simultaneously with the second base station 321 as the 5G gNB. According to an alternative embodiment, the second electronic device 302 may communicate with the first base station 311 as the LTE eNB in the LTE mode or the second base station 321 as the 5G gNB in a 5G mode.

Likewise, the third electronic device 303 may be located within the first coverage area 310 of the first base station 311 as the LTE eNB and simultaneously within the third coverage area 330 of the third base station 331 as a 5G gNB. In this case, the third electronic device 303 may communicate with the first base station 311 as the LTE eNB in the LTE mode and simultaneously with the third base station 331 as the 5G gNB. According to an alternative embodiment, the third electronic device 303 may communicate with the first base station 311 as the LTE eNB in the LTE mode or the third base station 331 as the 5G gNB in the 5G mode.

Likewise, the fourth electronic device 304 may be located with the first coverage area 310 of the first base station 311 as the LTE eNB and simultaneously within the fourth coverage 340 of the fourth base station 341 as a 5G gNB. In this case, the fourth electronic device 304 may communicate with the first base station 311 as the LTE eNB in the LTE mode and simultaneously with the fourth base station 341 as the 5G gNB. According to an alternative embodiment, the fourth electronic device 304 may communicate with the first base station 311 as the LTE eNB in the LTE mode or the fourth base station 341 as the 5G gNB in the 5G mode.

Referring to FIG. 3D, the second electronic device 302 may be located at a cell boundary or cell edge of the first base station 311. The third electronic device 303 may be located close to the first base station 311. The fourth electronic device 304 may be located closer to the first base station 311 than the second electronic device 302 and further away from the first base station 311 than the third electronic device 303. Referring to FIG. 3D, assuming that there is neither artificial nor natural obstacles such as a building, a mountain, and a hill on the propagation path, the third electronic device 303 among the electronic devices in communication with the first base station 311 may be assigned the lowest power and/or the higher data rate. Under the same assumption, the first base station 311 may assign the highest power and/or the lowest data rate to the second electronic device 302.

According to an embodiment, the first base station 311 as the LTE eNB may communicate with the electronic devices 301, 302, 303, and 304 in an LTE frequency division duplexing (FDD) mode or an LTE time division duplexing (TDD) mode. According to an alternative embodiment, the first base station 311 may support only the LTE FDD mode. According to an alternative embodiment, the first base station 311 may support only the LTE TDD mode.

According to an embodiment, the electronic device 301, 302, 303, and 304 may support both the LTE FDD and LTE TDD modes. According to an embodiment, if the electronic devices 301, 302, 303, and 304 support both the LTE FDD and LTE TDD modes and communicate with the first base station 311 as the LTE base station in a TDD mode, they may be able to communicate with a 5G gNB in the TDD mode. In the case of communicating with the 5G gNB in the TDD mode, the electronic devices 301, 302, 303, and 304 may perform uplink power control according to the TDD mode. According to an alternative embodiment, in the case of communicating with the first base station 311 as the LTE eNB in an FDD mode, the electronic devices 301, 302, 303, and 304 may be able to communicate with a 5G gNB in the FDD mode. In the case of communicating with the 5G gNB in the FDD mode, the electronic devices 301, 302, 303, and 304 may perform uplink power control according to the FDD mode.

According to an embodiment, the electronic devices 301, 302, 303, and 304 may support only one of the LTE FDD and LTE TDD modes. According to an embodiment, if the electronic devices 301, 302, 303, and 304 communicate with the first base station 311 as the LTE eNB only in the TDD mode, they may be able to communicate with the second to fifth base stations as the 5G gNBs in the TDD mode. In the case of communicating with the first base station 311 and the 5G gNBs in the TDD mode, the electronic devices 301, 302, 303, and 304 may perform uplink power control according to the TDD mode.

According to an alternative embodiment, if the electronic devices 301, 302, 303, and 304 communicate with the first base station 311 as the LTE base station in the FDD mode, they may be able to communicate with the second to fifth base stations as the 5G gNBs in the FDD mode. In the case of communicating with the first base station 311 and the 5G gNBs in the FDD mode, the electronic devices 301, 302, 303, and 304 may perform uplink power control according to the FDD mode.

According to various embodiments, the second electronic device 201 may be located at a cell boundary or cell edge. If it is necessary for the second electronic device 302 located at the cell boundary to perform uplink transmission to the first base station 311, the first base station 311 may assign a maximum allowed transmit power to the second electronic device 302 for the uplink transmission. In this case, the second electronic device 302 cannot perform uplink transmission to the second base station 321 because there is no extra power to be assigned for the uplink transmission to the second base station 321. According to an embodiment, the second electronic device 302 located at the cell boundary or cell edge of the first base station 311 may communicate with the first and second base stations 311 and 321 in the TDD mode for uplink transmission.

According to various embodiments, the third electronic device 303 may be located close to the first base station 311. If it is necessary for the third electronic device 303 located close to the first base station 311 to perform uplink transmission to the first base station 311, the first base station 311 may assign a transmit power lower than the maximum allowed transmit power to the third electronic device 303. In this case, the third electronic device 303 may be able to allocate a transmit power for transmission to the third base station 331. According to an embodiment, the third electronic device 303 located close to the first base station 311 or having a good communication channel to the first base station 311 may operate in the FDD mode and use a dynamic power sharing scheme.

Figure 4:
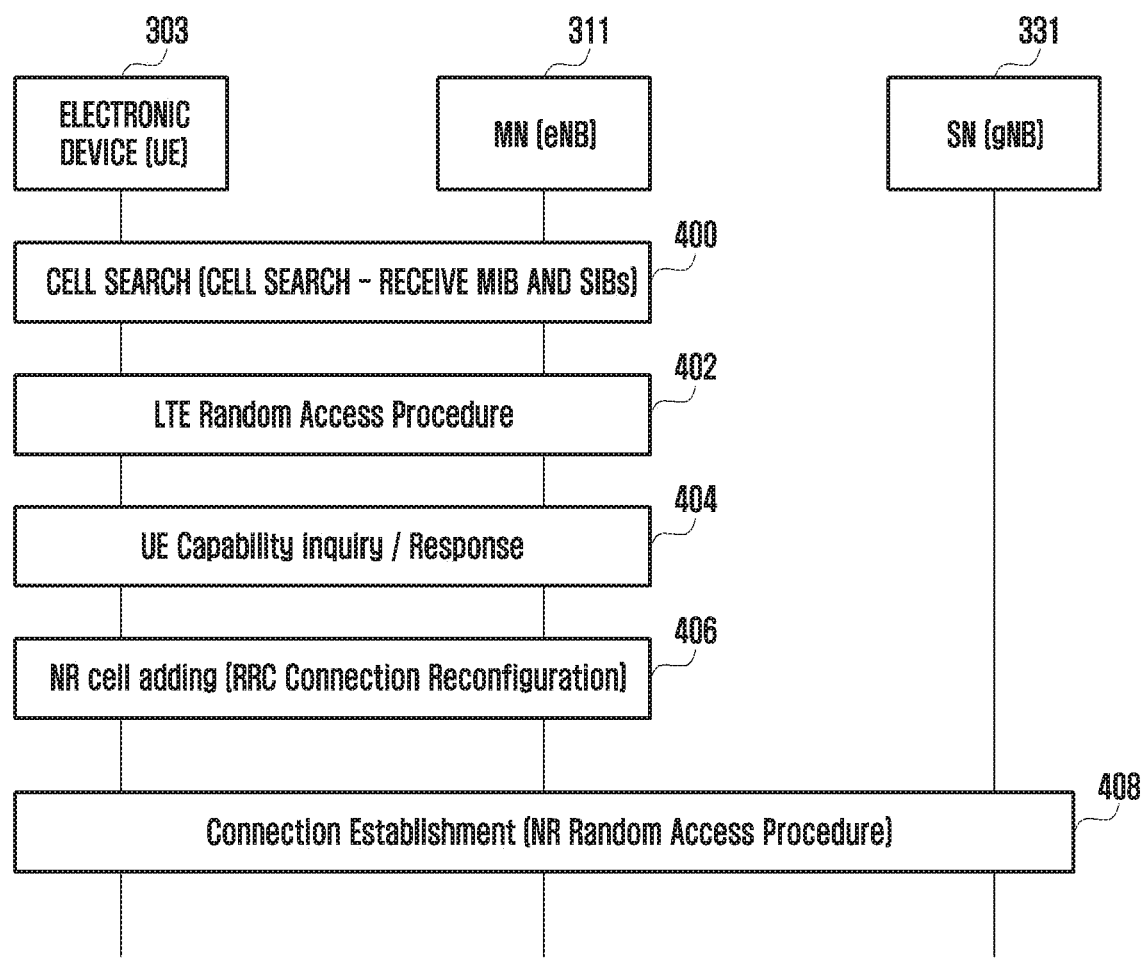
FIG. 4 is a signal flow diagram illustrating a procedure for EN-DC of an electronic device according to an embodiment of the disclosure.

FIG. 4 is a signal flow diagram illustrating a procedure for EN-DC of an electronic device (e.g., second electronic device 302 in FIG. 3D) according to an embodiment of the disclosure.

Before undertaking the detailed description with reference to FIG. 4, it may be necessary to understand that the operations being described with reference to FIG. 4 are applicable to any type of multi-RAT dual connectivity (MR-DC) environment in which an electronic device is simultaneously connected to two networks (first and second networks) of different RATs. A base station of the first network may be a master node (MN) (e.g., MN 370 in FIG. 3A), and a base station of the second network may be a secondary node (SN) (e.g., SN 380 in FIG. 3A). The signal flow diagram of FIG. 4 shows an E-UTRA NR dual connectivity (EN-DC) procedure for an electronic device to connect to the first network as an LTE network and the second network as an NR network. The following description is directed to an EN-DC procedure for an electronic device to establish connections to an LTE eNB (e.g., first base station 311 in FIG. 3D) and an NR gNB (e.g., third base station 331 in FIG. 3D). However, it is obvious to those skilled in the art that the operations being carried out in the EN-DC environment can be applied to other MR-DC environments.

Referring to FIG. 4, the third electronic device 303 may perform cell search for an MN, e.g., first base station 311 as an LTE eNB. According to an embodiment, the third electronic device 303 may receive a master information block (MIB) and/or a system information block (SIB) from the first base station 311 in the course of the cell search. According to an embodiment, the first base station 311 may transmit the MIB and SIB through a physical broadcast channel (PBCH). According to an embodiment, the first base station 311 may broadcast two or more SIBs through the PBCH and, among the SIBs, SIB1 may include various parameters for use by an electronic device located within the coverage area of the first base station 311 in access to the first base station 311 and scheduling information on other SIBs. The SIB1 being transmitted by the first base station 311 may also include a maximum uplink transmit power value (P-Max$_{LTE}$) of the electronic devices located within the coverage area of the first base station 311. Accordingly, the third electronic device 303 may acquire, at operation 400, the information on the maximum uplink transmit power configured by the first base station 311. According to an embodiment, the third electronic device 303 may store the MIB, SIB, and maximum uplink transmit power information received from the first base station 311 in a memory (e.g., memory 130 in FIG. 2).

According to an embodiment, the third electronic device 303 may perform, at operation 402, a random access procedure with the first base station 311 based on the information included in the SIB1 received in the course of the cell search at operation 400.

According to an embodiment, after the completion of the random access procedure with the third electronic device 303, the first base station 311 may transmit, at operation 404, an electronic device capability enquiry (UE capability enquiry) message to the third electronic device 303. According to various embodiments, the third electronic device 303 may generate and transmit, at operation 404, an electronic device capability information (UE capability or UE capability information) message to the first base station 311 in response to the electronic device capability enquiry (UE capability enquiry) message.

According to various embodiments, the electronic device capability information message may include information indicating whether the third electronic device 303 supports dynamic power sharing for allocating power for data transmission to different base stations connected in the EN-DC environment. According to an embodiment, in the case where the third electronic device 303 can simultaneously connect to an LTE eNB and an NR gNB in the EN-DC environment and dynamically allocate power for uplink transmissions to the LTE eNB and the NR gNB, the UE capability information message may include information indicating that dynamic power sharing is supported. According to an alternative embodiment, in the case where the third electronic device 303 is capable of connecting to an LTE eNB and an NR gNB in the EN-DC environment and cannot allocate power for uplink transmissions to the LTE eNB and the NR gNB, the UE capability information message may include the information indicating that dynamic power sharing is not supported. According to an alternative embodiment, in the case where the third electronic device 303 can simultaneously connect to an LTE eNB and an NR gNB in the EN-DC environment and dynamically allocate power for uplink transmissions to the LTE eNB and the NR gNB, the UE capability information message may include information indicating that dynamic power sharing is supported subject to a predetermined condition.

According to various embodiments, after receiving the electronic device capability information message from the third electronic device 303 at operation 404, the first base station 311 may command, at operation 406, the third electronic device 303 to add a secondary node, e.g., third base station 331 (NR cell adding). According to various embodiments, the first base station 311 may transmit a radio resource control (RRC) connection reconfiguration message to the third electronic device 303 to command the third electronic device 303 to add the third base station 331 (NR cell adding). That is, the first base station 311 may generate the RRC connection reconfiguration message including the command for the third electronic device to add the third base station 331 and transmit the message to the third electronic device 303.

According to an embodiment, if the first base station 311 may command the third electronic device 303 to add the third base station 331 at operation 406, this may mean that there are large amounts of data to be transmitted to the third electronic device 303. According to an alternative embodiment, if the first base station 311 may command the third electronic device 303 to add the third base station 331 at operation 406, this may mean that data transmission to the third electronic device 303 via the third base station 331 is more efficient. According to an alternative embodiment, if the first base station 311 may command the third electronic device 303 to add the third base station 331 at operation 406, this may mean that the first base station 311 is out of resources while the third base station 331 has sufficient resources.

According to various embodiments, the first base station 311 may configure maximum uplink transmit powers for uplink transmissions to the first and third base stations 311 and 331 in the RRC connection reconfiguration message. According to an embodiment, the first base station 311 may reuse the maximum uplink transmit power for transmission to the first base station 311, which has been configured at operation 400, in the RRC connection reconfiguration message. According to an alternative embodiment, the first base station 311 may configure newly the maximum uplink transmit power for transmission to the first base station 311 in the RRC connection reconfiguration message.

According to an embodiment, the first base station 311 may configure the maximum uplink transmit power for transmission to the first base station 311 in the RRC connection reconfiguration in consideration of the maximum uplink transmission power for transmission to the third base station 331 and a maximum allowed transmit power of the third electronic device 303. According to an alternative embodiment, the first base station 311 may configure the maximum uplink transmit power for transmission to the first base station 311 in the RRC connection reconfiguration message in consideration of only the maximum allowed transmit power of the third electronic device 303.

According to various embodiments, the first base station 311 may transmit an electronic device addition control message for adding the third electronic device to the third base station 331 simultaneously with, before, and/or after transmitting the RRC connection reconfiguration message to the third electronic device 303. According to an embodiment, the electronic device addition control message may include information on the third electronic device 303 to be added. According to an alternative embodiment, the electronic device addition control message may include the maximum uplink transmit power of the third base station 331.

According to various embodiments, the third electronic device 303 may perform, at operation 408, a connection establishment procedure with the third base station 331 in response to the message commanding to add the third base station 331 that is received from the first base station 311 at operation 406. According to an embodiment, the third electronic device 303 may perform a random access procedure with the third base station 331 at operation 408.

According to various embodiments, the third electronic device 303 has completed a cell selection for the third base station 331 before performing the connection establishment procedure with the third base station at operation 408. In this case, the third electronic device 303 may have received the MIB and SIB from the third base station 331 through a PBCH. According to an embodiment the third base station 331 may broadcast two or more SIBs and, among the SIBs, SIB1 may include various parameters for use by the third electronic device 303 in access to the third base station 331 and scheduling information on other SIBs. The SIB1 being transmitted by the third base station 331 may also include information on maximum uplink transmit power (P-Max$_{LTE}$) of the electronic devices located within the coverage area of the third base station 331.

According to various embodiments, whether the third electronic device 303 supports dynamic power sharing in the EN-DC environment may determine whether the third electronic device 303 is capable of transmitting uplink data and/or control messages simultaneously to the master and secondary nodes 311 and 331. According to an embodiment, the first and second base stations 311 and 331 may configure their own maximum allowed powers independently of each other in the EN-DC environment. According to an embodiment, the third electronic device 303 supporting dynamic power sharing may receive the maximum uplink transmit power information from the first and second base stations 311 and 331 to which the third electronic device 303 is simultaneously connected in the EN-DC environment. In this case, the third electronic device 303 may dynamically determine its uplink transmit power based on its maximum allowed transmit power and the maximum uplink transmit power information received from the first and third base stations 311 and 331.

According to various embodiments, assuming that the maximum allowed uplink transmit power of the third electronic device 303 supporting the dynamic power sharing is 23 dBm, the third electronic device 303 may dynamically allocate an uplink transmit power within its maximum allowed uplink transmit power of 23 dBm based on the maximum uplink transmit power information (P-Max$_{LTE}$) received from the first base station 311 and the maximum uplink transmit power information (P-Max$_{NR}$) received from the third base station 331.

According to an embodiment, it may be necessary for the third electronic device 303 to perform uplink transmission to the first and third base stations 311 and 331 at different time points. In this case, the third electronic device 303 may allocate an uplink transmit power within its maximum allowed uplink transmit power (P-Max$_{UE}$) based on each of the maximum uplink transmit power information P-Max$_{LTE}$ received form the first base station 311 and P-Max$_{NR}$ received from the third base station 331.

According to an alternative embodiment, it may be necessary for the third electronic device 303 to perform uplink transmission simultaneously to the first and third base stations 311 and 331. In this case, the third electronic device 303 may have the maximum uplink transmission powers configured each by the first and second base stations 311 and 331 in the memory 130.

According to an embodiment, the sum of the maximum uplink transmit powers configured by the first and third base stations 311 and 331 may be equal to less than the maximum allowed uplink transmit power of the third electronic device 303. In this case, the third electronic device 303 may transmit uplink data/control signals at a power within the range of each of the maximum uplink transmit powers configured by the first and third base stations 311 and 331.

According to various embodiments, the first and third base stations 311 and 331 may configure their own maximum allowed powers independently of each other in the EN-DC environment. According to an embodiment, if the third electronic device 303 does not support the dynamic power sharing, it may receive maximum uplink transmit power information from the first and third base stations 311 and 331 in the EN-DC environment in which the electronic device 303 has been simultaneously connected to the first and third base stations 311 and 331. Because the third electronic device 303 does not support the dynamic power sharing, a TDD mode may be configured between the first base station 311 as the master node and the third electronic device 303. In this case, the third base station 331 as the secondary node may also be controlled to operate in the TDD mode, which is configured between the third base station 331 and the first electronic device 301, for downlink and uplink transmissions.

According to an alternative embodiment, the third base station 331 as the secondary node may be controlled to perform downlink transmission and uplink reception independently from the TDD mode configured between the third electronic device 303 and the first base station 311. In this case, if it is necessary for the third electronic device 303 to perform uplink transmission simultaneously to the first and third base stations 311 and 331, the third electronic device 303 may perform only the uplink transmission of data/control signals to the first base station 311 as the master node. Afterward, the third electronic device 303 may perform uplink transmission of data/control signals to the third base station 331 at a different time point.

FIG. 5A is a diagram for explaining uplink-downlink configurations in an LTE network according to an embodiment of the disclosure.

Before undertaking the detailed description with reference to FIG. 5A, it may be necessary to understand that the operations being described with reference to FIG. 5A are applicable to any type of multi-RAT dual connectivity (MR-DC) environment in which an electronic device is simultaneously connected to two networks (first and second networks) of different RATs. A base station of the first network may be a master node (MN) (e.g., MN 370 in FIG. 3A), and a base station of the second network may be a secondary node (SN) (e.g., SN 380 in FIG. 3A). The following description is made with reference to FIG. 5A in an EN-DC environment, as an example of the MR-DC environment, with an LTE network (e.g., first cellular network 292 in FIG. 2) as the first network and an NR network (e.g., second cellular network 294 in FIG. 2) as the second network. However, it is obvious to those skilled in the art that the operations being carried out in the EN-DC environment can be applied to other MR-DC environments.

The LTE standard defines uplink-downlink configurations for TDD as exemplified in FIG. 5A. Referring to FIG. 5A, the first column 510 of the table lists the uplink-downlink configurations (i.e., uplink-downlink configuration #0, uplink-downlink configuration #1, uplink-downlink configuration #2, uplink-downlink configuration #3, uplink-downlink configuration #4, uplink-downlink configuration #5, and uplink-downlink configuration #06), and the second column 520 shows downlink-uplink switch-point periodicities of the uplink-downlink configurations as defined in the LTE standard.

The uplink-downlink configurations #0 to #2 and #6 have a downlink-uplink switch-point periodicity of 5 ms, and the uplink-downlink configurations #3 to #5 have a downlink-uplink switch-point periodicity of 10 ms. The third column 530 is divided into 10 sub-column designated subframes to show whether a corresponding subframe in the corresponding uplink-downlink configuration is a downlink (D) subframe, uplink subframe (U), or special (S) subframe.

According to an embodiment, the uplink-downlink configuration #0 has a downlink-uplink switch-point periodicity of 5 ms and includes $0^{th}$ to $9^{th}$ subframes that are respectively D, S, U, U, U, D, S, U, U, and U subframes, as denoted by a reference number 511. According to an alternative embodiment, the uplink-downlink configuration #6 has a downlink-uplink switch-point periodicity of 5 ms and includes $0^{th}$ to $9^{th}$ subframes that are respectively D, S, U, U, U, D, S, U, U, and D subframes, as denoted by a reference number 512. This means that the ratio of uplink and downlink data transmission amounts can be adaptively adjusted by selecting one of the uplink-downlink configurations defined in the LTE standard.

Figure 5B:
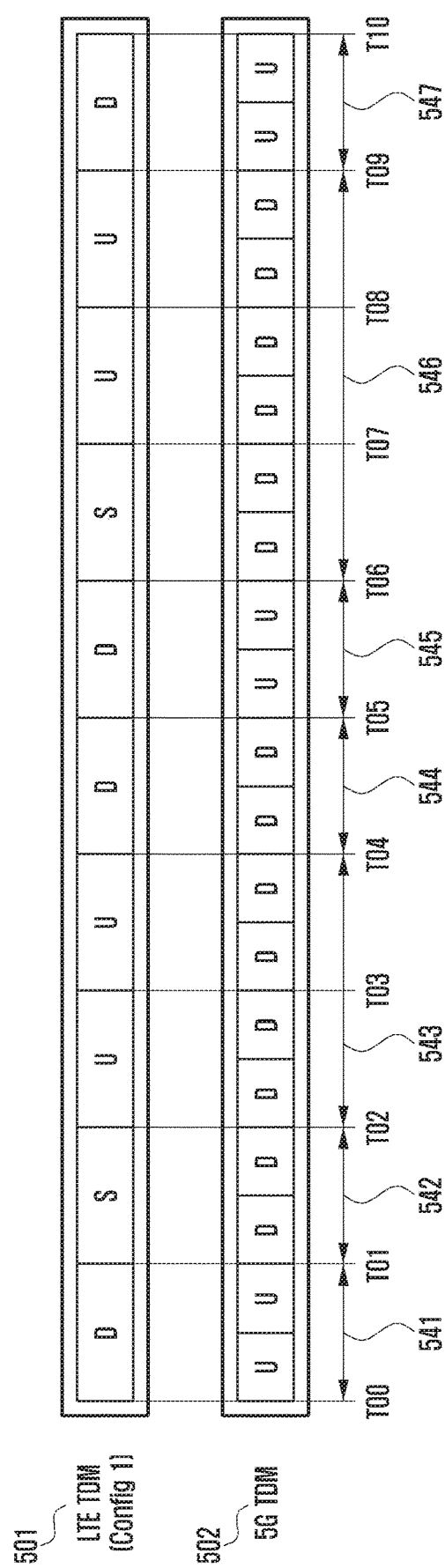
FIG. 5B is a diagram illustrating a time-division multiplexing (TDM) configuration for uplink and downlink transmissions in a 5G network in association with a time division duplexing (TDD) uplink-downlink configuration of an LTE network according to an embodiment of the disclosure.

FIG. 5B is a diagram illustrating a TDM configuration for uplink and downlink transmissions in a 5G network in association with a TDD uplink-downlink configuration of an LTE network according to an embodiment of the disclosure.

Before undertaking the detailed description with reference to FIG. 5B, it may be necessary to understand that the operations being described with reference to FIG. 5B are applicable to any type of multi-RAT dual connectivity (MR-DC) environment in which an electronic device is simultaneously connected to two networks (first and second networks) of different RATs. A base station of the first network may be a master node (MN) (e.g., MN 370 in FIG. 3A), and a base station of the second network may be a secondary node (SN) (e.g., SN 380 in FIG. 3A). The following description is made with reference to FIG. 5B in an EN-DC environment, as an example of the MR-DC environment, with an LTE network (e.g., first cellular network 292 in FIG. 2) as the first network and an NR network (e.g., second cellular network 294 in FIG. 2) as the second network. However, it is obvious to those skilled in the art that the operations being carried out in the EN-DC environment can be applied to other MR-DC environments.

Referring to FIG. 5B, an LTE eNB (e.g., first base station 311 in FIG. 3D) and the electronic device (e.g., third electronic device 303 in FIG. 3D) are configured to operate in the uplink-downlink configuration #1 including $0^{th}$ to $9^{th}$ subframes that are respectively D, S, U, U, D, D, S, U, U, and D subframes as denoted by reference number 501.

According to an embodiment, a 5G gNB (e.g., third base station 331 in FIG. 3D) may be configured with a 5G time division multiplexing (TDM) scheme having an uplink-downlink configuration 502 in consideration of the uplink-downlink configuration #1 501 between the LTE eNB 311 and the third electronic device 303. According to an embodiment, the third base station 331 may configure two uplink (U) subframes in a period 541 between time points T00 and T01 that corresponds to a downlink (D) subframe in the uplink-downlink configuration #1 between the first base station 311 and the third electronic device 303. According to an alternative embodiment, the third base station 331 may allocate one or three or more uplink (U) subframes to the third electronic device 303 in the period 541 between the time points T00 and T01.

According to an embodiment, the third base station 331 may configure two downlink (D) subframes in a period 542 between time points T01 and T02 that corresponds to a special (S) subframe in the uplink-downlink configuration #1 501 between the first base station 311 and the third electronic device 303. According to an alternative embodiment, the third base station 331 may allocate one or three or more downlink (D) subframes to the third electronic device 303 in the period 542 between the time points T01 and T02.

According to an embodiment, the third base station 331 may be able to configure four downlink (D) subframes in a period 543 between time points T02 and T04 that corresponds to two uplink (U) subframes in the uplink-downlink configuration #1 501 between the first base station 311 and the third electronic device 303. According to an alternative embodiment, the third base station 331 may allocate one or two or more downlink (D) subframes to the third electronic device 303 in each of a period between T02 and T03 and a period between T03 and T04 or in the period 543 between T02 and T04.

According to an embodiment, the third base station 331 may configure one or two or more uplink (U) subframes in a period 544 between time points T04 and T05 that corresponds to a downlink (D) subframe in the uplink-downlink configuration #1 501 between the first base station 311 and the third electronic device 303. However, in the embodiment of FIG. 5B, the third base station 331 configures two downlink (D) subframes for the third electronic device 303 in the period 544 between time points T04 and T05. In this manner, the third base station 331 may configure one or two or more downlink (D) subframes in a period available for one or two or more uplink (U) subframes.

According to various embodiments, the third base station 331 may allocate downlink (D) subframes in a period available for configuring uplink (U) subframes in the following cases.

First, the third base station 331 may receive a report indicating that there is no uplink data to transmit (e.g., an uplink buffer of the third electronic device 303 is empty) from the third electronic device 303 according to an embodiment.

Second, the third electronic device 303 has uplink data to be transmitted to the third base station 331 that is not delay-sensitive or that is very small in amount according to an embodiment.

Third, the third base station 331 may have a large amount of downlink data to be transmitted to the third electronic device 303 according to an embodiment. In these cases, the third base station 331 may allocate downlink (D) subframes in the period available for configuring uplink (U) subframes.

According to various embodiments, the third base station 331 may configure one or two or more uplink (U) subframes in a period 545 between time points T05 and T06 that corresponds to a downlink (D) subframe in the uplink-downlink configuration #1 501 between the first base station 311 and the third electronic device 303.

According to an embodiment, the third base station 331 may configure one or two or more downlink (D) subframes in a period 546 between time points T06 and T09 that corresponds to one special (S) subframe and two uplink (U) subframes in the uplink-downlink configuration #1 501 between the first base station 311 and the third electronic device 303.

According to various embodiments, the third base station 331 may configure one or two or more downlink (D) subframes in a period 547 between time points T09 and T10 that corresponds to a downlink (D) subframe in the uplink-downlink configuration #1 501 between the first base station 311 and the third electronic device 303.

According to various embodiments, in the case where the first base station 311 communicates with the second electronic device 302 and/or the fourth electronic device 304 in a TTD mode, it may be possible to allocate subframes between the second base station 321 and the second electronic device 302 and between the fourth base station 341 and the fourth electronic device 304 in the same manner as described with reference to FIG. 5B.

According to various embodiments, the third electronic device 303 may perform uplink transmission to the first base station 311 and uplink transmission to the third base station 331 that are orthogonal in the time domain. If the uplink transmissions to the first and second base stations 311 and 331 are orthogonal in the time domain, this means that the uplink transmission periods to the first and third base stations 311 and 331 are not overlapped in the time domain. Because the uplink transmission periods to the first and third base stations 311 and 331 are not overlapped in the time domain, the third electronic device 303 may be able to use its maximum allowed transmit power for uplink transmission to each of the first and third base stations 311 and 331. According to an embodiment, a first communication processor (e.g., first communication processor 212 in FIG. 2) of the third electronic device 303 may be able to use the maximum allowed transmit power of the third electronic device 303 during the period 543 between T02 and T04 and the period 546 between T07 and T09 for uplink data and/or control signal transmission to the first base station 311. According to an alternative embodiment, a second communication processor (e.g., second communication processor 214 in FIG. 2) of the third electronic device 303 may be able to use the maximum allowed transmit power of the third electronic device 303 during the periods 541, 545, and 547 for uplink data and/or control signal transmission to the third base station 331.

Figure 5C:
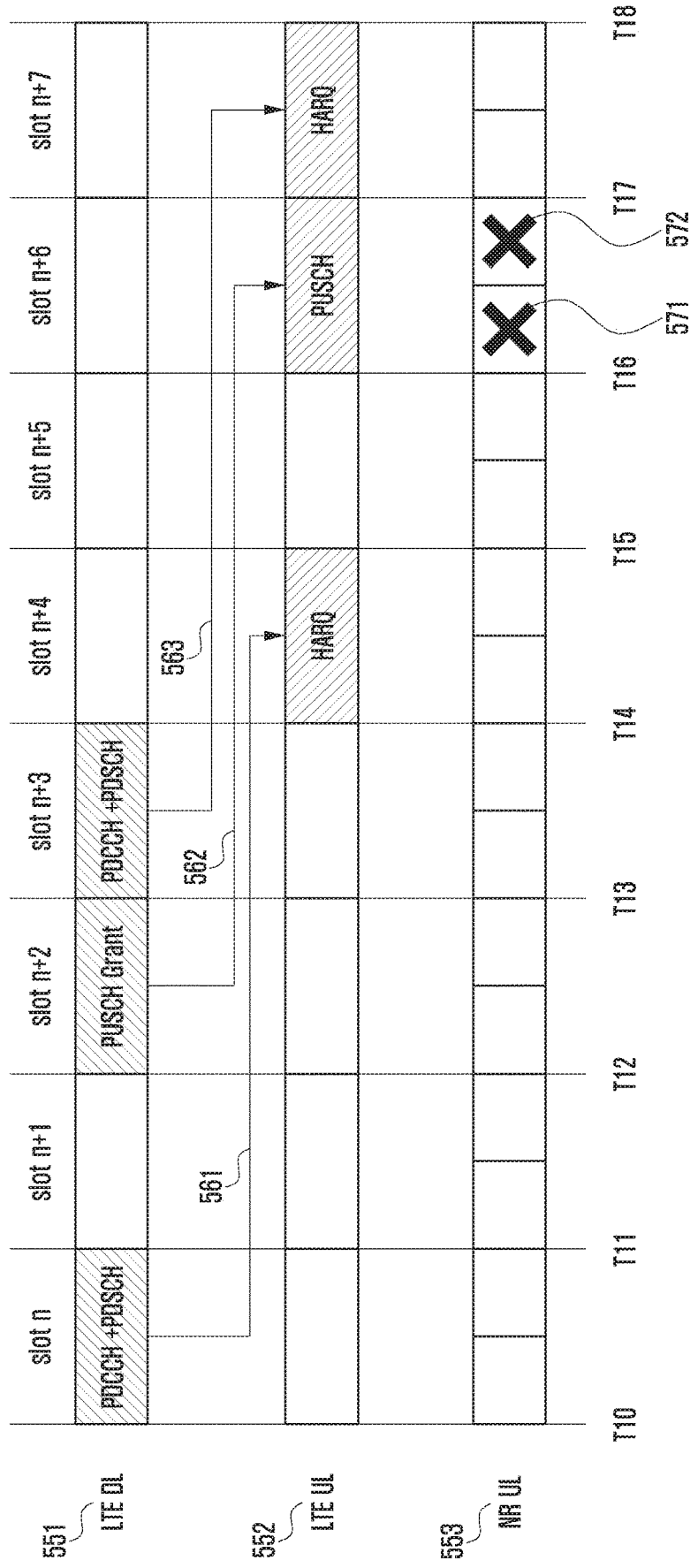
FIG. 5C is a diagram for explaining an uplink operation corresponding to a downlink operation in an LTE network and an uplink operation in a 5G network according to an embodiment of the disclosure.

FIG. 5C is a diagram for explaining an uplink operation corresponding to a downlink operation in an LTE network and an uplink operation in a 5G network according to an embodiment of the disclosure.

Before undertaking the detailed description with reference to FIG. 5C, it may be necessary to understand that the operations being described with reference to FIG. 5C are applicable to any type of multi-RAT dual connectivity (MR-DC) environment in which an electronic device is simultaneously connected to two networks (first and second networks) of different RATs. A base station of the first network may be a master node (MN), and a base station of the second network may be a secondary node (SN). The following description is made with reference to FIG. 5C in an EN-DC environment, as an example of the MR-DC environment, with an LTE network (e.g., first cellular network 292 in FIG. 2) as the first network and an NR network (e.g., second cellular network 294 in FIG. 2) as the second network. However, it is obvious to those skilled in the art that the operations being carried out in the EN-DC environment can be applied to other MR-DC environments.

According to the LTE standard, an electronic device (e.g., third electronic device 303 in FIG. 3D) may notice a transmission in the LTE network based on control information, e.g., physical uplink shared channel (PUSCH) grant or physical downlink shared channel (PDSCH), 4 slots before. A description thereof is made with reference to FIG. 5C.

Referring to FIG. 5C, an LTE eNB (e.g., first base station 311 in FIG. 3D) may have a downlink (DL) slot corresponding to a period between time points T10 and T11. In the embodiment of FIG. 5C, each of a time period between T11 and T12, a time period between T12 and T13, a time period between T13 and T14, a time period between T14 and T15, a time period between T15 and T16, a time period between T16 and T17, and a time period between T17 and T18 may be a downlink/uplink slot. For the first base station 311 as an LTE eNB, a slot spans 1 ms. Assuming that the period between T10 and T11 is $n^{th}$ slot, the slot between T11 and T12 may become $(n+1)^{th}$ slot, the slot between T12 and T13 may become $(n+2)^{th}$ slot, the slot between T13 and T14 may become $(n+3)^{th}$ slot, the slot between T14 and T15 may become $(n+4)^{th}$ slot, the slot between T15 and T16 may become $(n+5)^{th}$ slot, the slot between T16 and T17 may become $(n+6)^{th}$ slot, and the slot between T17 and T18 may become $(n+7)^{th}$ slot.

According to an embodiment, the first base station 311 as the LTE eNB may transmit a PDSCH along with a physical downlink control channel (PDCCH) to the third electronic device in the $n^{th}$ slot. In this case, the third electronic device 303 may transmit a hybrid automatic repeat request (HARQ) response signal in the $(n+4)^{th}$ slot, which is 4 slots after the $n^{th}$ slot, in uplink as denoted by reference number 552. In FIG. 5C, a line 561 associates the control message and/or data being transmitted by the first base station 311 in downlink as denoted by reference number 551 with the response signal being transmitted 4 slots after in uplink as denoted by reference number 552.

According to an embodiment, the third electronic device 303 may transmit a message to request for resource allocation for uplink transmission in uplink as denoted by reference number 552 in a slot before the $n^{th}$ slot. In response to the message, the first base station 311 may transmit a PUSCH grant in the $(n+2)^{th}$ slot. If the third electronic device 303 receives the PUSCH grant in the $(n+2)^{th}$ slot, it may transmit a PUSCH in the $(n+6)^{th}$ slot, which is 4 slots after the $(n+2)^{th}$ slot, in uplink as denoted by reference number 552. In FIG. 5C, a line 562 associates the PUSCH grant being transmitted by the first base station 311 in downlink as denoted by reference number 551 with the PUSCH being transmitted 4 slots after in uplink as denoted by reference number 552.

According to an embodiment, the first base station 311 as the LTE eNB may transmit a PDSCH along with a PDCCH to the third electronic device 303 in the (n+3)th slot. In this case, the third electronic device 303 may transmit an HARQ response signal in the (n+7)th slot, which is 4 slots after the (n+3)th slot, in uplink as denoted by reference number 552. In FIG. 5C, a line 563 associates the control message and/or data being transmitted by the first base station 311 in downlink as denoted by reference number 551 with the response signal being transmitted 4 slots after in uplink as denoted by reference number 552.

According to various embodiments, the third electronic device 303 may communicate data and/or control messages with a 5G gNB (e.g., third base station 331 in FIG. 3D) in an EN-DC environment. According to an embodiment, the third electronic device 303 may transmit data and/or control messages to the third base station 331 in uplink as denoted by reference number 553. In this case, if the third electronic device 303 operates in an FDD mode and supports a dynamic power sharing scheme, it may adjust the uplink transmit power for transmission to the third based station 331 according to an uplink transmission to the first base station 311.

According to an embodiment, the third electronic device 303 has to monitor the downlink 551 at a slot (1 ms) for necessity of an uplink transmission 4 slots after the current slot. If it is necessary to transmit a control message and/or data in uplink, the third electronic device 303 has to calculate a transmit power for transmission to the first base station 311, identify a power available for uplink transmission of a control message and/or data to the third base station 331 as the 5G gNB in the case of simultaneous uplink transmission, and configure uplink transmit powers based thereon.

According to an embodiment, the third electronic device 303 may not have data and/or control messages to be transmitted to the first base station 311 during the period between T10 and T14. In this case, the third electronic device 303 may transmit data and/or control messages to the third base station 331 in uplink as denoted by reference number 553 during the period between T10 and T14. The third electronic device 303 may allocate a transmit power up to the maximum allowed transmit power for transmitting the data and/or control messages to the third base station 331 in uplink as denoted by reference number 553 during the period between T10 and T14 because the third electronic device 303 does not have data and/or control message to be transmitted to the first base station 311.

According to an alternative embodiment, the third electronic device may have data and/or control messages to be transmitted to the first base station during the period between T14 and T15 and the period T16 and T18. In this case, the third electronic device 303 may allocate a transmit power for transmitting the data and/or control signals to the first base station 311 in uplink as denoted by reference number 552 within a range of the maximum transmit power and a transmit power for transmitting data and/or control signals to the third base station 331 in uplink as denoted by reference number 553 within a range of the remaining transmit power. In this case, if the third electronic device 303 allocates the maximum transmit power for transmitting the data and/or control signals to the first base station 311 in uplink as denoted by reference number 552, it may suspend uplink transmission to the third base station 331. Reference numbers 571 and 572 denote that transmission to the third base station 331 in uplink, as denoted by reference number 553, is suspended.

Figure 6A:
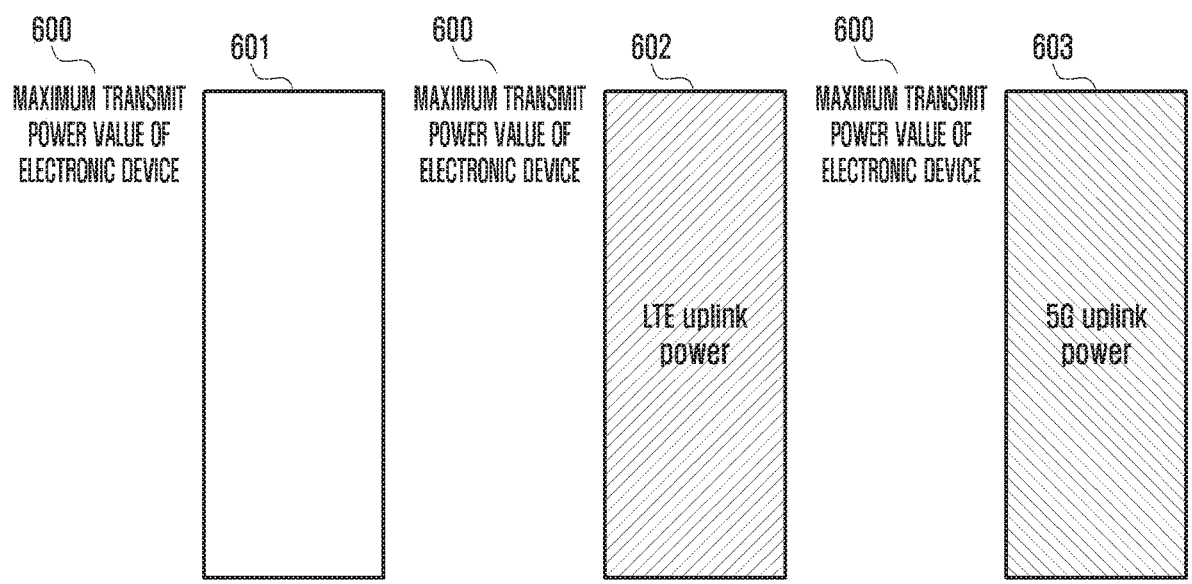
FIG. 6A is a diagram for explaining uplink transmit power allocation of an electronic device connected to two base stations in a TDD mode according to an embodiment of the disclosure.

FIG. 6A is a diagram for explaining uplink transmit power allocation of an electronic device (e.g., third electronic device 303 in FIG. 3D) connected to two base stations (e.g., first and third base stations 311 and 331 in FIG. 3D) in a TDD mode according to an embodiment of the disclosure.

Before undertaking the detailed description with reference to FIG. 6A, it may be necessary to understand that the operations being described with reference to FIG. 6A are applicable to any type of multi-RAT dual connectivity (MR-DC) environment in which an electronic device is simultaneously connected to two networks (first and second networks) of different RATs. A base station of the first network may be a master node (MN) (e.g., MN 370 in FIG. 3A), and a base station of the second network may be a secondary node (SN) (e.g., SN 380 in FIG. 3A). The following description is made with reference to FIG. 6A in an EN-DC environment, as an example of the MR-DC environment, with an LTE network (e.g., first cellular network 292 in FIG. 2) as the first network and an NR network (e.g., second cellular network 294 in FIG. 2) as the second network. However, it is obvious to those skilled in the art that the operations being carried out in the EN-DC environment can be applied to other MR-DC environments.

Referring to FIG. 6A, a maximum uplink transmit power 600 (or a maximum power threshold) of the third electronic device 303 may be set to a certain value. The third electronic device 303 may be simultaneously connected to the first and third base stations 311 and 331 in the EN-DC environment. If there is no uplink transmission from the third electronic device 303 that is simultaneously connected to the first and third base stations 311 and 331, this may mean that the third electronic device 303 may use no uplink transmit power as denoted by reference number 601.

According to various embodiments, the third electronic device 303 that is simultaneously connected to the first and third base stations 311 and 331 in the EN-DC environment may need to perform uplink transmission of data and/or control signals in a TDD mode. According to an embodiment, in the case where the first base station 311 is configured to operate in the TDD mode for uplink and downlink transmissions as described with reference to FIG. 5B, the third base station 331 may also be configured to operate in the TDD mode for uplink and downlink transmissions.

On the basis of the description made with reference to FIG. 5B, a description is made of the power allocation of the third electronic device 303 for uplink transmission of data and/or control signals with reference to FIG. 6A. According to an embodiment, the third electronic device 303 may be configured with downlink transmission from the first base station 311 and uplink transmission to the third base station 331 during the period 541. In this case, because there is only the uplink transmission to the third base station 331, the third electronic device 303 may allocate all of the maximum transmit power as an NR uplink power for transmission to the third base station 331 as denoted by reference number 603. Likewise, the third electronic device 303 may allocate all of the maximum transmit power as the NR uplink transmit power as denoted by reference number 603 during the periods 545 and 547 where there is only the uplink transmission to the third base station 331.

According to an embodiment, the third electronic device 303 may be configured with uplink transmission to the first base station 311 and downlink transmission from the third base station 331 during the period 543. In this case, the third electronic device 303 may allocate all of the maximum transmit power as an LTE uplink power for transmission to the first base station 311 as denoted by reference number 602. Likewise, the third electronic device 303 may allocate all of the maximum transmit power as the LTE uplink transmit power as denoted by reference number 602 during the period 546 between T07 and T09 where there is only the uplink transmission to the first base station 331.

According to various embodiments, in the case where the first base station 311 is configured to operate in the TDD mode, a second base station (e.g., second base station 321 in FIG. 3D), a third base station (e.g., third base station 331 in FIG. 3D), a fourth base station (e.g., fourth base station 341 in FIG. 3D), and a fifth base station (e.g., fifth base station 351 in FIG. 3D) may also be configured to operate in the TDD mode for uplink and downlink transmissions as exemplified with reference to FIG. 6A, and the power allocation may also be performed as exemplified with reference to FIG. 6A.

Figure 6B:
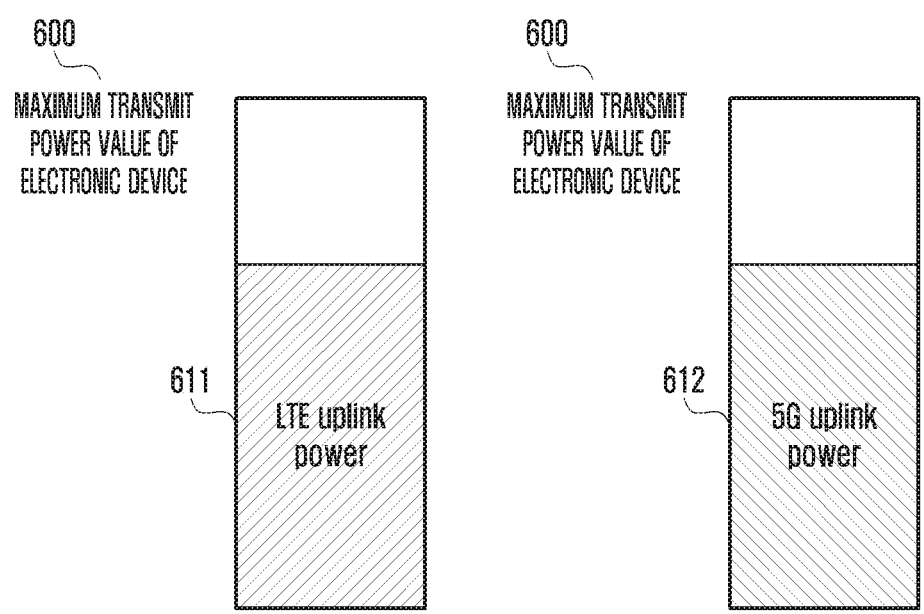
FIG. 6B is a diagram for explaining uplink transmit power allocation of an electronic device connected to two base stations in a frequency division duplexing (FDD) mode according to an embodiment of the disclosure.

FIG. 6B is a diagram for explaining uplink transmit power allocation of an electronic device (e.g., third electronic device 303 in FIG. 3D) connected to two base stations (e.g., first and third base stations 311 and 331 in FIG. 3D) in an FDD mode according to an embodiment of the disclosure.

Referring to FIG. 6B, a maximum uplink transmit power 600 of the third electronic device 303 may be set to a certain value. The third electronic device 303 may be simultaneously connected to the first and third base stations 311 and 331 in the EN-DC environment. If there is no uplink transmission from the third electronic device 303 that is simultaneously connected to the first and third base stations 311 and 331, this may mean that the third electronic device 303 may use no uplink transmit power as denoted by reference number 601 in FIG. 6A.

According to various embodiments, the third electronic device 303 that is simultaneously connected to the first and third base stations 311 and 331 in the EN-DC environment may need to perform uplink transmission of data and/or control signals in an FDD mode. According to an embodiment, even in the case where the third electronic device 303 connected to the first and third base stations 311 and 331 in the EN-DC environment performs uplink transmission of data and/or control signals in the FDD mode, the third electronic device 303 may perform uplink transmissions to the first and third base stations 311 and 331 without any overlap between the uplink transmissions as in the TDD mode. According to an alternative embodiment, in the case where the third electronic device 303 connected to the first and third base stations 311 and 331 in the EN-DC environment performs uplink transmissions of data and/or control signals in the FDD mode, the uplink transmissions to the first and third base stations 311 and 331 may be performed simultaneously (overlapped) in the time domain.

In the case where the third electronic device 303 operating in the EN-DC environment performs uplink transmissions of data and/or control signals in the FDD mode such that the uplink transmissions are not overlapped, per-base station required uplink transmit powers may be determined as shown in FIG. 6B.

According to an embodiment, a first communication processor (e.g., first communication processor 212 in FIG. 2) of the third electronic device 303 may determine a transmit power (LTE uplink power) 611 as the transmit power recommended by the first base station 311 as an LTE eNB for uplink transmission of the data and/or control signals and transmit the data and/or control signals in uplink with the determined transmit power.

According to an embodiment, a second communication processor (e.g., second communication processor 214 in FIG. 2) of the third electronic device 303 may determine a transmit power (5G uplink power) 612 as the transmit power recommended by the third base station 331 as a 5G gNB for uplink transmission of the data and/or control signals and transmit the data and/or control signals in uplink with the determined transmit power. As described above, in the case where the uplink transmissions are not overlapped with each other, the third electronic device 303 may configure the uplink transmit power within the range of the maximum transmit power 600.

According to various embodiments, in the case where the third electronic device 303 needs to perform uplink transmission of data and/or control signals to the first and third base stations 311 and 331 simultaneously, the sum of uplink transmit powers recommended from the first and third base stations 311 and 331 may exceed a maximum allowed transmit power of the third electronic device 303. According to an embodiment, assuming that the maximum allowed transmit power of the first electronic device 301 is 23 dBm, if the maximum transmit powers configured by the first and third base stations 311 and 331 are respectively 22 dBm and 23 dBm, the sum of the maximum transmit powers respectively recommended by the first and third base stations 311 and 331 is greater than the maximum allowed transmit power of the third electronic device 303. In this case, the third electronic device 303 may need to adjust transmit power allocation.

According to various embodiments, in the case where the third electronic device 303 does not support dynamic power sharing, it may be expected for the first base station 311 to configure a TDD mode. According to various embodiments, if the first base station 311 configures one of TDD modes for data communication with the third electronic device 303, the third electronic device 303 may operate separate time periods for the first and third base stations 311 and 331. This may be the case where the third electronic device 303 does not support the dynamic power sharing.

According to various embodiments, in the case where the third electronic device 303 does not support the dynamic power sharing, if the third base station 331 is added after the third electronic device 303 transmits an electronic device capability information (UE capability information) message to the first base station 311, the sum of a maximum uplink transmit power (P-Max$_{LTE}$) configured by the first base station 311 and a maximum uplink transmit power (P-Max$_{NR}$) configured by the third base station 331 may be equal to or less than the maximum allowed transmit power of the third electronic device 303. For example, it may be assumed that the maximum allowed transmit power of the first electronic device 301 is 23 dBm and the maximum uplink transmit power (P-Max$_{LTE}$) recommended by the first base station 311 and the maximum uplink transmit power (P-Max$_{NR}$) recommended by the third base station 331 are 20 dBm each. In this case, because the transmit power required for the third electronic device 303 to perform uplink transmission of data/control signals simultaneously to the first and third base stations 311 and 331 becomes "P$_{LTE}$+P$_{NR}$=20 dBm+20 dBm=23 dBm", the third electronic device 303 may be able to allocate the transmit power within the range of its maximum allowed transmit power.

However, in this case, the third electronic device 303 has to operate only in the TDD mode because it has to transmit the electronic device capability information indicating that it does not support the dynamic power sharing, which may decrease the degree of freedom of scheduling.

The various disclosed embodiments provide a method and apparatus that is capable of improving the degree of freedom of scheduling and data/control signal transmission efficiency based on the maximum uplink transmit power (P-Max$_{LTE}$) recommended by the first base station 311 and the maximum uplink transmit power (P-Max$_{NR}$) recommended by the third base station 331 even when the third electronic device 303 does not support the dynamic power sharing.

The various disclosed embodiments provide a method and apparatus that is capable of improving radio resource utilization efficiency even when the third electronic device 303 does not support the dynamic power sharing.

Figure 7:
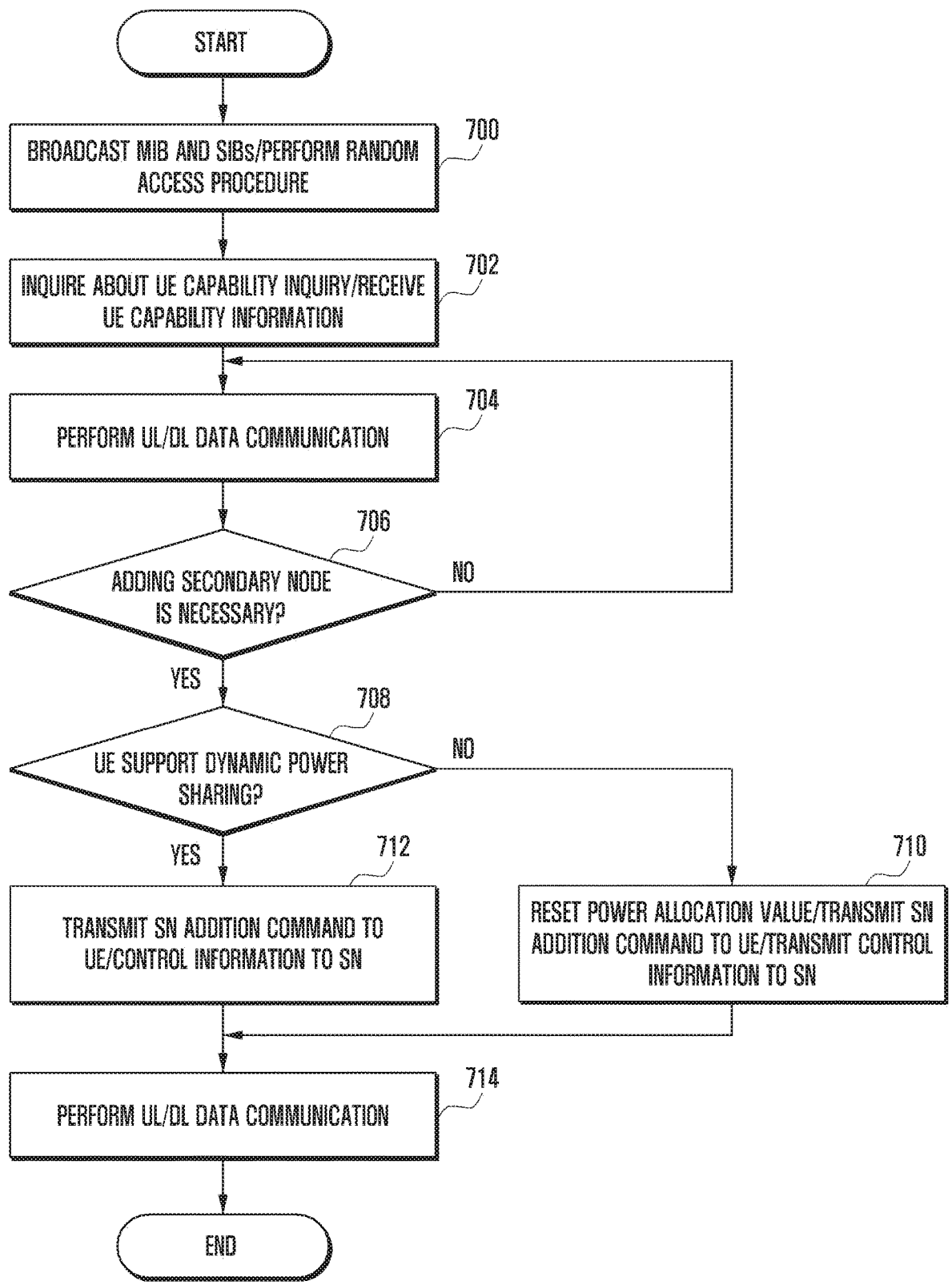
FIG. 7 is a flowchart illustrating an operation of a master node (MN) base station for adding a secondary node (SN) base station for an electronic device according to an embodiment of the disclosure.

FIG. 7 is a flowchart illustrating an operation of an MN base station (e.g., first base station 311 in FIG. 3D) for adding an SN base station for an electronic device (e.g., third electronic device 303 in FIG. 3D) according to an embodiment of the disclosure.

Before undertaking the detailed description with reference to FIG. 7, it may be necessary to understand that the operations being described with reference to FIG. 7 are applicable to any type of multi-RAT dual connectivity (MR-DC) environment in which an electronic device is simultaneously connected to two networks (first and second networks) of different RATs. A base station of the first network may be a master node (MN) (e.g., MN 370 in FIG. 3A), and a base station of the second network may be a secondary node (SN) (e.g., SN 380 in FIG. 3A). The following description is made with reference to FIG. 7 in an EN-DC environment, as an example of the MR-DC environment, with an LTE network (e.g., first cellular network 292 in FIG. 2) as the first network and an NR network (e.g., second cellular network 294 in FIG. 2) as the second network. However, it is obvious to those skilled in the art that the operations being carried out in the EN-DC environment can be applied to other MR-DC environments.

According to various embodiments, the first base station 311 may transmit an MIB and SIBs through a broadcast channel at operation 700. At operation 700, the first base station 311 may receive a signal for random access from the third electronic device 303.

According to various embodiments, at operation 702 the first base station 311 may transmit an electronic device capability information (UE capability information) enquiry message to the third electronic device 303 and receive an electronic device capability information (UE capability information) message from the third electronic device 303. According to various embodiments, the electronic device capability information may indicate whether the third electronic device 303 supports EN-DC. According to various embodiments, the electronic device capability information may also indicate whether the third electronic device 303 supports dynamic power sharing in an EN-DC environment.

According to an embodiment, the third electronic device 303 may support EN-DC and dynamic power sharing. According to an alternative embodiment, the third electronic device 303 may support EN-DC and may not support dynamic power sharing. According to an alternative embodiment, the third electronic device 303 may not support EN-DC. If the third electronic device 303 does not support EN-DC, it may not include a second communication processor (e.g., second communication processor 214 in FIG. 2) and corresponding wireless modules (e.g., second RFIC 224, second RFFE 234, second antenna module 244, and third antenna module 246). In the embodiment of FIG. 7, it is assumed that the third electronic device 303 supports EN-DC.

According to various embodiments, the first base station 311 performs, at operation 704, downlink transmission and uplink reception based on the electronic device capability information received from the third electronic device 303. According to an embodiment, the first base station 311 and the third electronic device 303 may communicate in an LTE FDD mode or an LTE TDD mode.

According to various embodiments, the first base station 311 may determine at operation 706 whether adding a secondary node (e.g., third base station 331 in FIG. 3D) for the third electronic device 303 is necessary. According to an embodiment, in the case where there is a large amount of data to be transmitted to the third electronic device 303, the first base station 311 may determine to add the third base station 331 for the third electronic device 303. According to an alternative embodiment, in the case where there is a large amount of uplink data to be transmitted by the third electronic device 303, the first base station 311 may determine to add the third base station 331 for the third electronic device 303. According to an alternative embodiment, in the case where the first base station 311 is out of resources as a number of electronic devices to serve increases and the third electronic device 303 is capable of communication with the third base station 331, the first base station 311 may determine to add the third base station 331 for the third electronic device 303. According to an alternative embodiment, in the case where adding the third base station 331 is expected to improve the efficiency of communication with the third electronic device 303, the first base station 311 may determine to add the third base station 331 for the third electronic device 303. The first base station 311 may determine to add the third base station 331 for the third electronic device 303 for various other reasons.

According to various embodiments, if it is determined at operation 706 that adding the third base station 331 as the secondary node is necessary (YES), the procedure goes to operation 708; if it is determined at operation 706 that adding the third base station 331 as the secondary node is not necessary (NO), the procedure goes back to operation 704. According to an embodiment, operation 708 is performed in the case where the electronic device capability information received at operation 702 indicates that the third electronic device 303 supports EN-DC.

According to various embodiments, if it is determined at operation 706 to add the third base station 331 as the secondary node for the third electronic device 303, the first base station 311 may determine at operation 708 whether the third electronic device 303 supports dynamic power sharing based on the electronic device capability information received at operation 702 from the third electronic device 303. According to an embodiment, if it is determined at operation 708 that the third electronic device 303 supports dynamic power sharing (Yes) based on the electronic device capability information received from the third electronic device 303, the procedure goes to operation 712. According to an alternative embodiment, if it is determined at operation 708 that the third electronic device 303 does not support dynamic power sharing (NO) based on the electronic device capability information received from the third electronic device 303, the procedure goes to operation 710.

According to various embodiments, the first base station 311 may command, at operation 712, the third electronic device 303 to add the third base station 331 as a secondary node. In this case, the first base station 311 may use an RRC connection reconfiguration message to command the third electronic device 303 to add the third base station 331 (NR cell adding). That is, the first base station 311 may generate and transmit the RRC connection reconfiguration message including the instruction commanding to add the third base station 331 to the third electronic device 303. The first base station may perform UL/DL data communication, at operation 714.

According to various embodiment, the RRC connection reconfiguration message being transmitted from the first base station 311 to the third electronic device 303 may include information on a newly configured maximum uplink transmit power for transmission to the first base station 311 in the EN-DC environment. According to an alternative embodiment, the RRC connection reconfiguration message being transmitted from the first base station 311 to the third electronic device 303 may include the maximum uplink transmit power that has been previously configured for transmission to the first base station 311.

According to an embodiment, the first base station 311 may transmit, at operation 712, a message or signal indicative or informative of access of the third electronic device 303 to the third base station 331 as the secondary node while commanding the third electronic device 303 to add the third base station 331 as the secondary node. According to various embodiments, the first base station 311 may transmit, at operation 712, an electronic device adding control message to the third base station 331 simultaneously with, before, and/or after transmitting the RRC connection reconfiguration message to the third electronic device 303. According to an embodiment, the electronic device adding control message may include an instruction commanding addition of the third electronic device 303. According to an alternative embodiment, the electronic device adding control message may include information on the electronic device to be added, e.g., identification information of the electronic device.

According to various embodiments, the first base station 311 may command the third electronic device 303 to add the third base station 331 as a secondary node. In this case, the first base station 311 may use an RRC connection reconfiguration message to command the third electronic device 303 to add the third base station 331 (NR cell adding). That is, the first base station 311 may generate and transmit the RRC connection reconfiguration message including the instruction commanding addition of the third base station 331 to the third electronic device 303. According to an embodiment, the RRC connection reconfiguration message being transmitted from the first base station 311 to the third electronic device 303 may include information on a newly configured maximum uplink transmit power for transmission to the first base station 311 in the EN-DC environment.

According to various embodiments, the first base station 311 may transmit, at operation 710, a message or signal indicative or informative of access of the third electronic device 303 to the third base station 331 as the secondary node while commanding the third electronic device 303 to add the third base station 331 as the secondary node. According to an embodiment, the message or signal indicative or informative of access of the third electronic device 303 being transmitted from the first base station 311 to the third base station 331 may include information indicating the maximum allowed uplink transmit power for transmission to the third base station 331. According to various embodiments, the first base station 311 may transmit, at operation 710, an electronic device adding control message to the third base station 331 simultaneously with, before, and/or after transmitting the RRC connection reconfiguration message to the third electronic device 303. According to an embodiment, the electronic device adding control message may include an instruction commanding addition of the third electronic device 303. According to an alternative embodiment, the electronic device adding control message may include a maximum uplink transmit power of the third base station 331. According to an alternative embodiment, the electronic device adding control message may include information on the electronic device to be added, e.g., identification information of the electronic device. According to an alternative embodiment, the electronic device adding control message may include information indicative of simultaneous uplink transmission to the first and third base stations 311 and 331.

According to various embodiments, the first base station 311 may acquire a maximum transmit power value of the third electronic device 303 from the electronic device capability information received at operation 702. For example, if the maximum transmit power value of the third electronic device 303 is 23 dBm, the first base station 311 may set a maximum uplink transmit power (p-max$_{LTE}$) to 20 dBm in the RRC connection reconfiguration message. According to various embodiments, the first base station 311 may instruct the third base station 331 to set a maximum allowed uplink power (P-Max$_{NR}$) for the third base station 331 to 20 dBm by way of example in the message or signal indicative or informative of access of the third electronic device 303.

According to various embodiments, the first base station 311 may configure the FDD mode for communication in the EN-DC environment in the case where the electronic device capability information received at operation 702 indicates that the third electronic device 303 does not support dynamic power sharing. In this case, the secondary node addition command being transmitted from the first base station 311 to the third electronic device 303 may include information indicative of simultaneous uplink transmission to the first and third base stations 311 and 331. According to an embodiment, if the first base station 311 has commanded to perform simultaneous uplink transmission to the first and third base stations 311 and 331, it may update the maximum uplink transmit power for transmission to the first base station 311 to a new value and transmit information for limiting a maximum uplink transmit power to the third base station 331. According to an embodiment, the control message being transmitted from the first base station 311 to the third base station 331 may include information for limiting the maximum uplink transmit power to the third base station 331.

According to an alternative embodiment, in the case where the electronic device capability information received at operation 702 from the third electronic device 303 indicates that the third electronic device 303 does not support dynamic power sharing, the first base station 311 may configure a TDD mode for communication. At operation 710, after configuring the TDD mode for communication with the third electronic device 303, the first base station 311 may instruct the third electronic device 303 to perform simultaneous uplink transmission to the first and third base stations 311 and 331 using the secondary node adding command or a separate control command. In this case, the sum of the maximum uplink transmit power values configured for the first and third base stations 311 and 331 may be equal to or less than the maximum allowed transmit power of the third electronic device 303 that is acquired from the electronic device capability information.

According to various embodiments, after the third electronic device 303 adds the third base station 331 and the secondary node, the first base station 311 may perform uplink/downlink data communication with the third electronic device 303. As described above, the first base station 311 is capable of controlling the third electronic device 303 to perform simultaneous uplink transmission to the first and third base stations 311 and 331 regardless of the duplexing mode (i.e., TDD and FDD) configured therebetween in such a way of determining the maximum uplink transmit powers of the first and third base stations 311 and 331 and sharing the information on the maximum uplink transmit powers of the first and third base stations 311 and 331 with the third base station 331 and the third electronic device 303.

Figure 8:
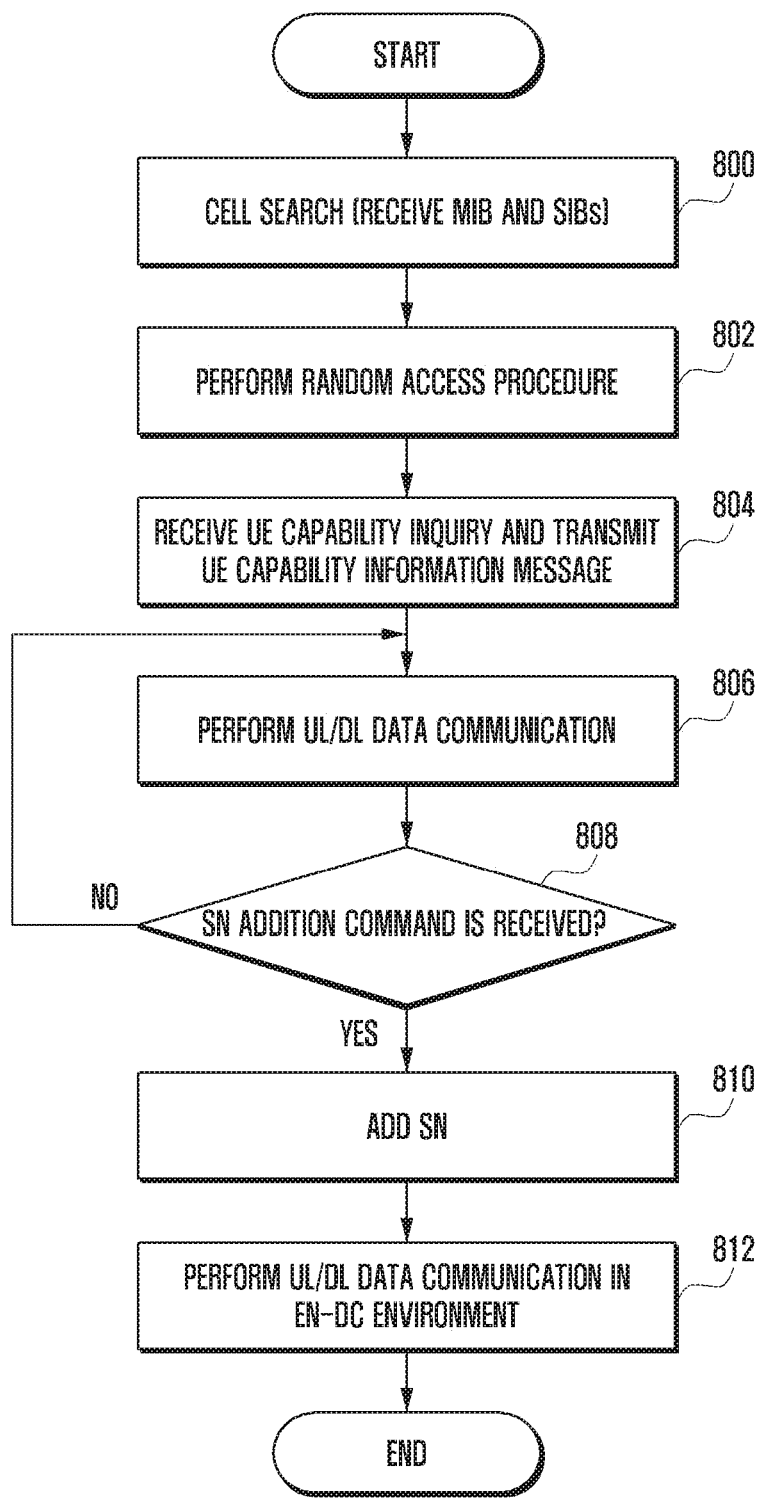
FIG. 8 is a flowchart illustrating an operation of an electronic device for communication in an EN-DC environment according to an embodiment of the disclosure.

FIG. 8 is a flowchart illustrating an operation of an electronic device (e.g., third electronic device 303 in FIG. 3D) for communication in an EN-DC environment according to an embodiment of the disclosure.

Before undertaking the detailed description with reference to FIG. 8, it may be necessary to understand that the operations being described with reference to FIG. 8 are applicable to any type of multi-RAT dual connectivity (MR-DC) environment in which an electronic device is simultaneously connected to two networks (first and second networks) of different RATs. A base station of the first network may be a master node (MN) (e.g., MN 370 in FIG. 3A), and a base station of the second network may be a secondary node (SN) (e.g., SN 380 in FIG. 3A). The following description is made with reference to FIG. 8 in an EN-DC environment with an LTE network (e.g., first cellular network 292 in FIG. 2) as the first network and an NR network (e.g., second cellular network 294 in FIG. 2) as the second network. The EN-DC environment is an MR-DC environment. Accordingly, it is obvious to those skilled in the art that the operations being carried out in the EN-DC environment can be applied to other MR-DC environments.

According to various embodiments, the third electronic device 303 may perform cell search for a cell of an LTE network. According to an embodiment, the third electronic device 303 may perform the cell search for the cell of the LTE network using a first communication processor (e.g., first communication processor 212 in FIG. 2), a first RFIC (e.g., first RFIC 222 in FIG. 2), a first RFFE (e.g., first RFFE 232 in FIG. 2), and a first antenna module (e.g., first antenna module 242 in FIG. 2). According to an embodiment, the third electronic device 303 may achieve synchronization by using a signal received from a first base station (e.g., first base 311 in FIG. 3D) as an LTE eNB (MN) in the course of the cell search at operation 800 and receive an MIB and an SIB. According to an embodiment, the third electronic device 303 may acquire information on the maxim uplink transmit power information (P-Max$_{LTE}$) for the first base station 311 from the SIB. According to an embodiment, the third electronic device 303 may store information obtained from the MIB and SIB in a memory (e.g., memory 130 in FIG. 2).

According to various embodiments, after the cell search operation, the third electronic device 303 may perform a random access procedure at operation 802 by using a processor 120 and/or the first communication processor 212, the first RFIC 222, the first RFFE 232, and the first antenna module 242. Next, the third electronic device 303 may receive an electronic device capability enquiry (UE capability enquiry) message from the first base station 311 by using the first communication processor 212, the first RFIC 222, the first RFFE 232, and the first antenna module 242.

According to various embodiments, the processor (e.g., processor 120 and/or first communication processor 212 in FIG. 2) of the third electronic device 303 may generate an electronic device capability information (UE capability information) message and transmit the electronic device capability information message to the first base station 311 at operation 804, by using the first RFIC 222, the first RFFE 232, and the first antenna module 242, in response to the electronic device enquiry message from the first base station 311. According to an embodiment, the electronic device capability information being transmitted by the third electronic device 303 may include information on the maximum allowed transmit power (P-Max$_{UE}$) of third electronic device 303. According to an embodiment, the processor (e.g., processor 120 and/or first communication processor 212 in FIG. 2) of the third electronic device 303 may include information indicating whether the third electronic device 303 supports EN-DC in the electronic device capability information. According to an embodiment, in the case where the third electronic device 303 is capable of connecting to and communicating with a second network such as an NR network in the course of communicating with the first base station 311 as the master node, the processor (e.g., processor 120 and/or first communication processor 212 in FIG. 2) of the third electronic device 303 may include the information indicating that the third electronic device 303 supports EN-DC in the electronic device capability information. According to an alternative embodiment, in the case where the third electronic device 303 is incapable of connecting to and communicating with a second network such as an NR network in the course of communicating with the first base station 311 as the master node, the processor (e.g., processor 120 and/or first communication processor 212 in FIG. 2) of the third electronic device 303 may include the information indicating that the third electronic device 303 does not support EN-DC in the electronic device capability information.

According to various embodiments, in the case where the third electronic device 303 is capable of connecting to and communicating with a second network such as an NR network in the course of communicating with the first base station 311 as the master node by using the first RFIC 222, the first RFFE 232, and the first antenna module 242 and is incapable of dynamic power sharing, the processor (e.g., processor 120 and/or first communication processor 212 in FIG. 2) of the third electronic device 303 may include the information indicating that the third electronic device 303 does not support dynamic power sharing in the electronic device capability information. According to an alternative embodiment, in the case where the third electronic device 303 is capable of connecting to and communicating with a second network such as an NR network in the course of communicating with the first base station 311 as the master node and capable of dynamic power sharing, the processor (e.g., processor 120 and/or first communication processor 212 in FIG. 2) of the third electronic device 303 may include the information indicating that the third electronic device 303 supports dynamic power sharing in the electronic device capability information. The electronic device capability information may include various kinds of capabilities of the electronic device such as an available communication frequency band and an available duplexing mode such as TDD and FDD.

According to various embodiments, after transmitting the electronic device capability information to the first base station 311 at operation 804, the third electronic device 303 may perform, at operation 806, uplink/downlink communication for transmitting/receiving data/control signals under the control of and/or as scheduled by the first base station 331.

The third electronic device 303 may determine at operation 808 whether a secondary node addition command for adding the third base station 331 as a secondary node is received. The first base station 311 may transmit a message including endc-ReleaseAndAdd-r15 set to "true" to instruct the third electronic device 303 to add the third base station 331. If the endc-ReleaseAndAdd-r15 is set to "true", this may mean that the first base station 311 commands the third electronic device 303 to add a cell of the NR network as the secondary cell. That is, the third electronic device 303 may receive a signal from the first base station 311 commanding the third electronic device 303 to add the third base station 331.

According to various embodiments, the third electronic device 303 may include a single communication processor configured for controlling communications with the MN and the SN in a wireless communication module (e.g., wireless communication module 192 in FIG. 2). According to an alternative embodiment, the third electronic device 303 may include a first communication processor (e.g., first communication processor 212 I FIG. 2) and a second communication processor (e.g., second communication processor 214 in FIG. 2) configured to respectively control communications with the MN and the SN in a wireless communication module (e.g., wireless communication module 192 in FIG. 2). That is, the third electronic device 303 may include the first communication processor 212 for controlling a signal communication between the third electronic device 303 and the master node and the second communication processor 214 for controlling a signal communication between the third electronic device 303 and the secondary node. In this case, the third electronic device 303 that is in communication with the first base station 311 as the master node may receive a secondary node addition command from the first base station 311 as the master node by means of the first communication processor (e.g., first communication processor 212 in FIG. 2) and identify the secondary node addition command. Upon receipt of the secondary node addition command from the first base station 311, the first communication processor 212 may command the second communication processor (e.g., second communication processor 214 in FIG. 2) to establish a connection to the secondary node or send the secondary node addition command to the second communication processor 214.

According to various embodiments, if it is determined at operation 808 that the secondary node addition command for adding the third base station 331 as a secondary node is received, the processor 120 and/or the second communication processor (e.g., second communication processor 214 in FIG. 2) of the third electronic device 303 may establish an additional connection with the secondary node at operation 810 by means of a second RFIC (e.g., second RFIC 224 in FIG. 2), a second RFFE (e.g., the second RFFE 234 in FIG. 2), and a second antenna module (e.g., second antenna module 244 in FIG. 2) or by means of a fourth RFIC (e.g., fourth RFIC 228 in FIG. 2) and a third antenna module (e.g., third antenna module 246 in FIG. 2). According to an alternative embodiment, if it is determined at operation 808 that no secondary node addition command is received, the procedure goes to operation 806.

According to various embodiments, the secondary node addition command for adding the third base station 331 that is received from the first base station 311 may include an updated maximum uplink transmit power value (P-Max$_{LTE}$) for transmission to the first base station 311. The third electronic device 303 may store the updated maximum uplink transmit power value (P-Max$_{LTE}$) for transmission to the first base station 311 in the memory 130. According to an embodiment, the first communication processor 212 of the third electronic device 303 may send the updated maximum uplink transmit power value (P-Max$_{LTE}$) for transmission to the first base station 311 to the second communication processor 214.

According to an embodiment, the first base station 311 may configure an FDD mode for communication in the EN-DC environment in the case where the electronic device capability information received at operation 804 indicates that the third electronic device 303 does not support dynamic power sharing. In this case, the secondary node addition command being transmitted from the first base station 311 to the third electronic device 303 may include information indicative of simultaneous uplink transmission to the first and third base stations 311 and 331 (in the same time period and/or at least some time slots among the time slots configured as uplink for the first base station 311). In this case, the first base station 311 may transmit information for limiting uplink transmit power for transmission to the third base station 331 to the third electronic device 303. In the case where the third electronic device 303 connects to the third base station 331, the third base station 331 may determine the maximum uplink transmit power value (P-Max$_{NR}$) for transmission to the third base station 331 per electronic device. In this manner, the third base station 331 may configure the maximum uplink transmit power value (P-Max$_{NR}$) for transmission to the third base station 331 based on the information received from the first base station 311 and transmit the maximum uplink transmit power value (P-Max$_{NR}$) to the third electronic device 303.

In the case where the processor 120 and/or the second communication processor (e.g., second communication processor 214 in FIG. 2) of the third electronic device 303 establishes an additional connection with the secondary node at operation 810 by means of a second RFIC (e.g., second RFIC 224 in FIG. 2), a second RFFE (e.g., the second RFFE 234 in FIG. 2), and a second antenna module (e.g., second antenna module 244 in FIG. 2) or by means of a fourth RFIC (e.g., fourth RFIC 228 in FIG. 2) and a third antenna module (e.g., third antenna module 246 in FIG. 2), it may receive the maximum uplink transmit power value (P-Max$_{NR}$) from the third base station 331. The third electronic device 303 may store the maximum uplink transmit power value (P-Max$_{NR}$) received from the third base station 331 in the memory 130.

According to an embodiment, the maximum uplink transmit power value (P-Max$_{NR}$) received from the third base station 331 may be configured using a p-NR value in an nr-SecondaryCellGroupConfig-r15 message.

Figure 9:
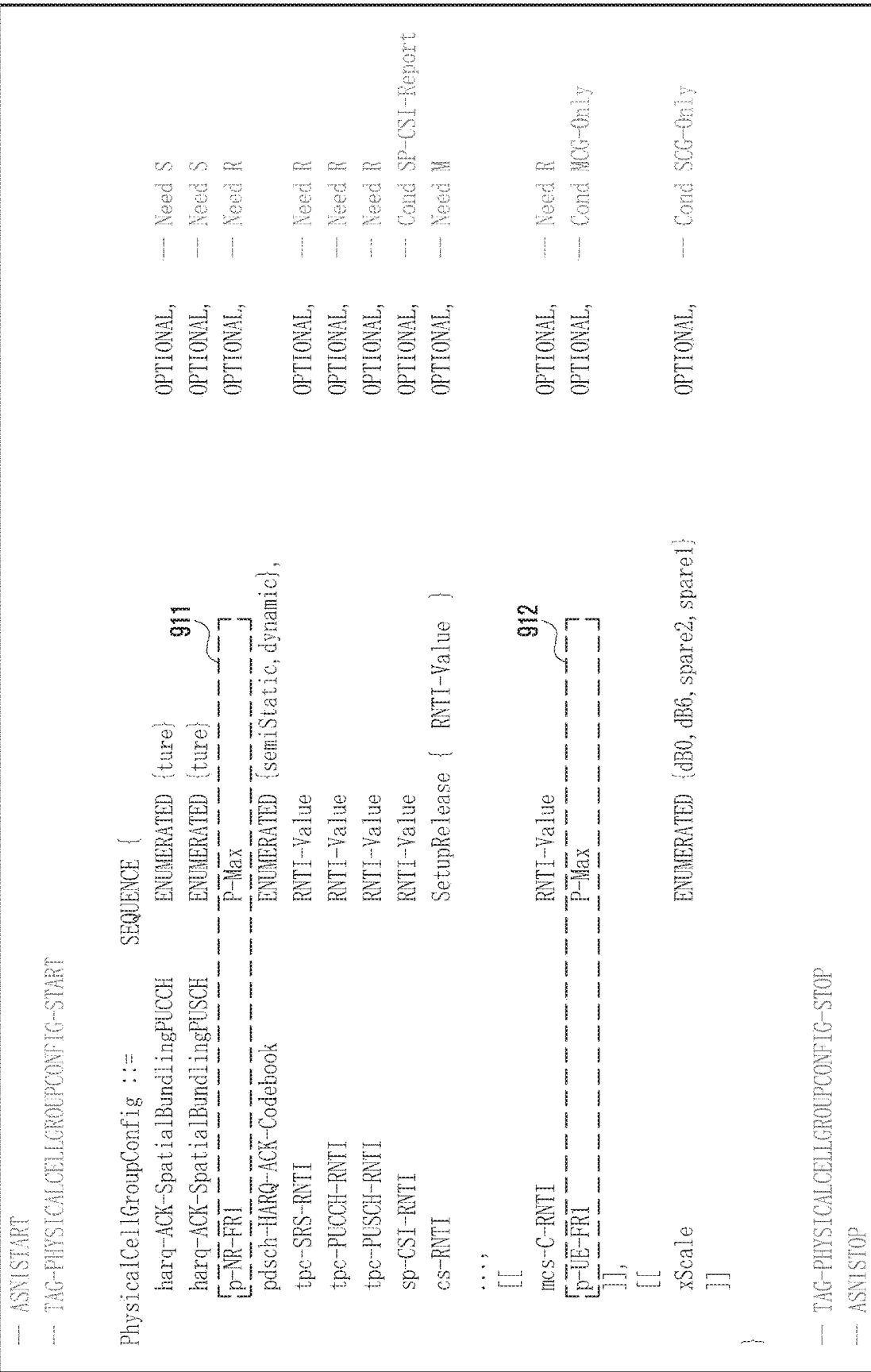
FIG. 9 is a diagram illustrating a message format being transmitted from a secondary node to an electronic device according to an embodiment of the disclosure.

FIG. 9 is a diagram illustrating a format of a message being transmitted from a secondary node to an electronic device (e.g., third electronic device 303 in FIG. 3D) according to an embodiment of the disclosure.

Referring to FIG. 9, reference numbers 911 and 912 denote p-NR-FR1 and p-UE-FR1, which are set to a P-Max value as an example. According to an embodiment, the p-NR-FR1 may be set to a value limiting the maximum transmit power of the electronic device (UE) that is allowed in an NR cell group including all serving cells operating in a first frequency range (FR1). According to an alternative embodiment, p-UE-FR1 may be a maximum transmit power value of the electronic device (UE) that is allowed in all serving cells belonging to all cell groups in the first frequency range (FR1). The third base station 331 may limit the maximum uplink transmit power (P-Max$_{NR}$) of the third electronic device 303 in accessing the third base station 331 by setting the p-NR-FR1 and p-UE-FR1 to certain values.

According to an alternative embodiment, in the case where the electronic device capability information indicates that the third electronic device 303 does not support dynamic power sharing, the first base station 311 may transmit to the third electronic device 303 a separate control message including information instructing the third electronic device 303 to operate in the TDD mode and perform simultaneous uplink transmission to the first and third base stations 311 and 331 along with a secondary node addition command. This may be the case where the sum of the maximum uplink transmit power values for the first and third base stations 311 and 331 is equal to or less than the maximum allowed transmit power of the third electronic device 303 that is acquired from the electronic device capability information.

According to various embodiments, after adding the third electronic device 303 as the secondary node at operation 810, the third electronic device 303 may perform uplink/downlink communication of data/control messages at operation 812 based on the information received from the first and third base stations 311 and 331. According to an embodiment, the third electronic device 303 may perform uplink/downlink communication with the first base station 311 by means of the processor 120 and/or the first communication processor 212, the first RFIC 222, the first RFFE 232, and the first antenna module 242. According to an embodiment, the third electronic device 303 may perform uplink/downlink communication with the third base station 331 either by means of the processor 120 and/or the second communication processor 214, the second RFIC 224, the second RFFE 234, and the second antenna module 244 or by means of the processor 120 and/or the second communication processor 214, the third RFIC 226, and the third antenna module 246.

According to various embodiments, after transmitting the electronic device capability information indicating that it does not support dynamic power sharing, if the third electronic device 303 receives a command instructing it to add the third base station 331 as a secondary node, this may be the case where simultaneous uplink transmission to the first and third base stations 311 and 331 is not indicated yet. In this case, the third electronic device 303 may compare the sum of the maximum uplink transmit power values (P-Max$_{LTE}$ and P-Max$_{NR}$) transmitted respectively by the first and third base stations 311 and 331 with the maximum allowed transmit power value of the third electronic device 303.

According to an embodiment, the sum of the maximum uplink transmit power values (P-Max$_{LTE}$ and P-Max$_{NR}$) transmitted respectively by the first and third base stations 311 and 331 may be equal to or less than the maximum allowed transmit power value of the third electronic device 303. In this case, the third electronic device 303 may perform, if necessary, uplink transmission to the third base station 331 even at a time point that is not an uplink occasion for the third base station 331 in the TDD, e.g., in a time period configured as uplink for the first base station 311 or at least part of the uplink time period. For example, even when the first base station 311 is communicating with the third electronic device 303 in the TDD mode, in the situation described with reference to FIG. 3C, the third electronic device 303 cannot perform uplink transmission to the third base station during the period between T16 and T17. If the sum of the maximum uplink transmit power values (P-Max$_{LTE}$ and P-Max$_{NR}$) transmitted respectively by the first and third base stations 311 and 331 is equal to or less than the maximum allowed transmit power value of the third electronic device 303, the third electronic device 303 may perform simultaneous uplink transmission to the first and third base stations 311 and 331 during the period between T16 and T17.

According to an alternative embodiment, the sum of the maximum uplink transmit power values (P-Max$_{LTE}$ and P-Max$_{NR}$) transmitted respectively by the first and third base stations 311 and 331 may be greater than the maximum allowed transmit power value of the third electronic device 303. In this case, the second communication processor 213 of the third electronic device 303 may determine the uplink transmit power for transmission to the third base station to be a value equal to or less than a difference obtained by subtracting the maximum uplink transmit power value (P-Max$_{LTE}$) for the first base station 311 from the maximum allowed transmit power value (P-Max$_{UE}$) of the third electronic device 303.

According to an alternative embodiment, in the case where the electronic device capability information indicates that the third electronic device 303 does not support dynamic power sharing, the first base station 311 may configure the third electronic device to operate in the TDD mode and transmit a separate control command instructing the third electronic device 303 to perform uplink simultaneous transmission to the first and third base stations 311 and 331 along with a secondary node addition command. This may be the case where the sum of the maximum uplink transmit power values for the first and third base stations 311 and 331 is equal to or less than the maximum allowed transmit power of the third electronic device 303 that is acquired from the electronic device capability information.

In this case, the third electronic device 303 may perform simultaneous uplink transmission to the first and third base stations 311 and 331 during the time period between T16 and T17.

Figure 10A:
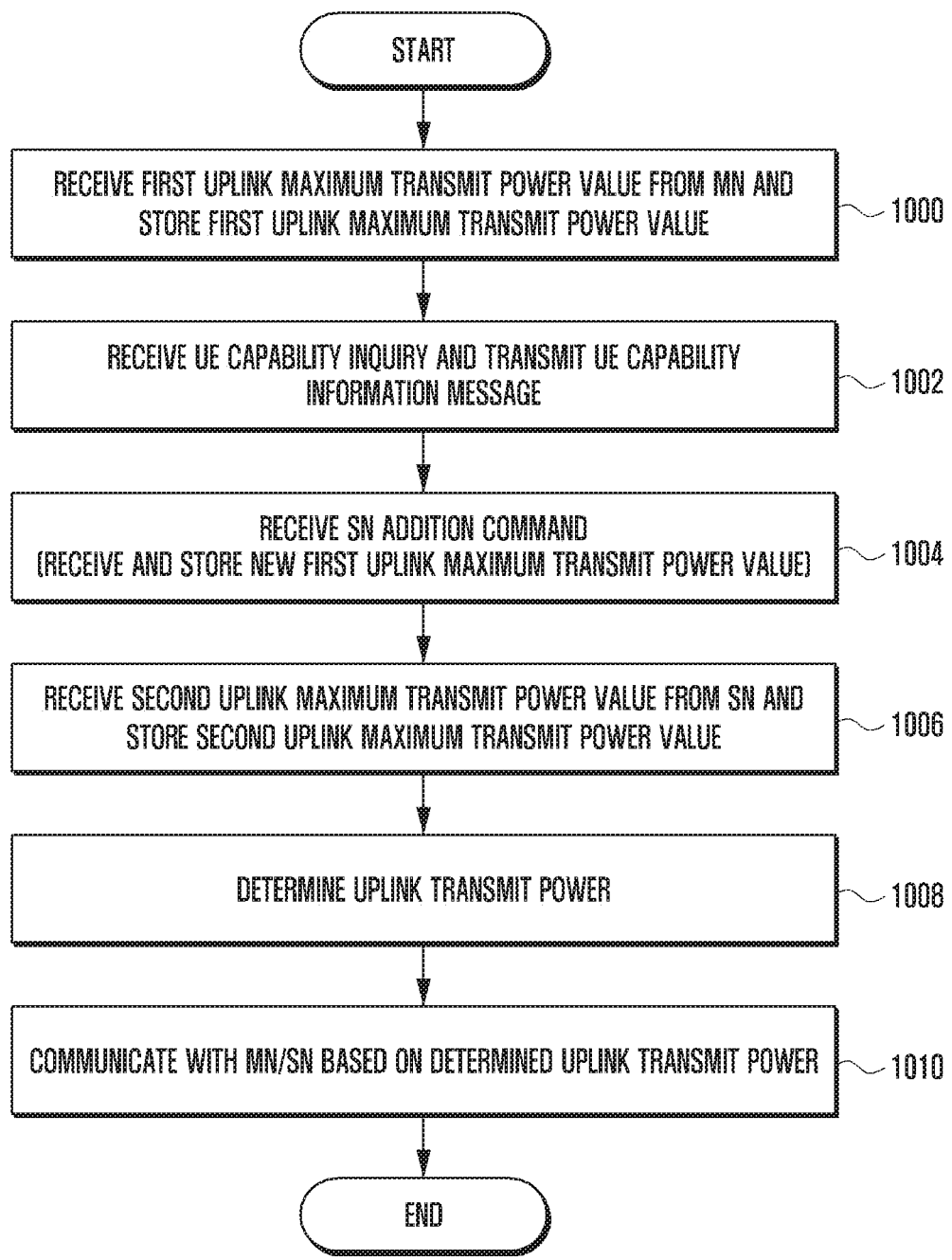
FIGS. 10A and 10B are flowcharts illustrating a transmit power control procedure of an electronic device in an EN-DC environment according to various embodiments of the disclosure.
Figure 10B:
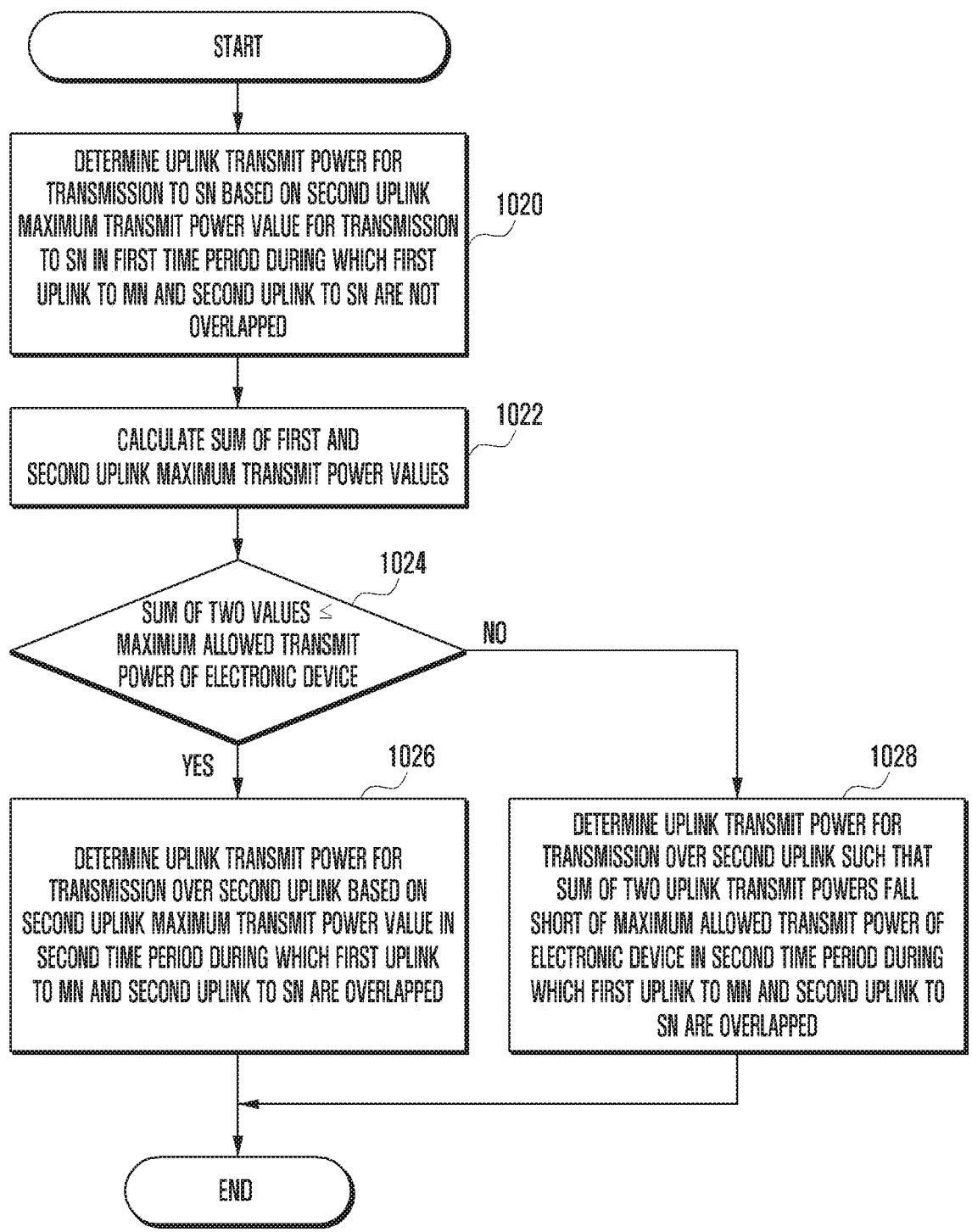

FIGS. 10A and 10B are flowcharts illustrating a transmit power control procedure of an electronic device (e.g., third electronic device 303 in FIG. 3D) in an EN-DC environment according to various embodiments of the disclosure.

Before undertaking the detailed description with reference to FIGS. 10A and 10B, it may be necessary to understand that the operations being described with reference to FIGS. 10A and 10B are applicable to any type of multi-RAT dual connectivity (MR-DC) environment in which an electronic device is simultaneously connected to two networks (first and second networks) of different RATs. A base station of the first network may be a master node (MN) (e.g., MN 370 in FIG. 3A), and a base station of the second network may be a secondary node (SN) (e.g., SN 380 in FIG. 3A). The following description is made with reference to FIGS. 10A and 10B in an EN-DC environment with an LTE network (e.g., first cellular network 292 in FIG. 2) as the first network and an NR network (e.g., second cellular network 294 in FIG. 2) as the second network. The EN-DC environment is an MR-DC environment. Accordingly, it is obvious to those skilled in the art that the operations being carried out in the EN-DC environment can be applied to other MR-DC environments.

According to various embodiments, the third electronic device 303 may receive, at operation 1000, information on a maximum uplink transmit power (P-Max$_{LTE}$) allowed for transmission to a master node from a first base station 311. According to an embodiment, the third electronic device 303 may acquire the information on the maximum uplink transmit power (P-Max$_{LTE}$) allowed for transmission to the first base station 311 from an MIB and an SIB that are received from the first base station 311 in search of a cell of an LTE network. According to an embodiment, the third electronic device 303 may search for the cell of the LTE network by means of a communication processor (e.g., second communication processor 212 in FIG. 2), a first RFIC (e.g., first RFIC 222 in FIG. 2), a first RFFE (e.g., in first RFFE 232 in FIG. 2), and a first antenna module (e.g., first antenna module 242 in FIG. 2). The third electronic device 303 may store the information acquired from the MIB and SIB received at operation 1000. Next, the third electronic device 303 may connect to the first base station 311 based on the information acquired from the received MIB and SIB.

According to various embodiments, the third electronic device 303 may receive an electronic device capability enquiry (UE capability enquiry) message from the first base station 311 by means of the first communication processor 212, the first RFIC 222, the first RFFE 232, and the first antenna module 242. The processor (e.g., processor 120 and/or first communication processor 212 in FIG. 2) of the third electronic device 303 may generate an electronic device capability information (UE capability information) message and transmit the electronic device capability information message to the first base station 311 at operation 1002, by means of the first RFIC 222, the first RFFE 232, and the first antenna module 242, in response to the electronic device enquiry message from the first base station 311. The electronic device capability information being transmitted by the third electronic device 303 may include information on the maximum allowed transmit power (P-Max$_{UE}$) of the third electronic device 303. According to an embodiment, the processor (e.g., processor 120 and/or first communication processor 212 in FIG. 2) of the third electronic device 303 may include information indicating whether the third electronic device 303 supports EN-DC in the electronic device capability information. According to an embodiment, in the case where the third electronic device 303 is capable of connecting to and communicating with a second network such as an NR network in the course of communicating with the first base station 311 as the master node, the processor (e.g., processor 120 and/or first communication processor 212 in FIG. 2) of the third electronic device 303 may include the information indicating that the third electronic device 303 supports EN-DC in the electronic device capability information. According to an alternative embodiment, in the case where the third electronic device 303 is incapable of connecting to and communicating with a second network such as an NR network in the course of communicating with the first base station 311 as the master node, the processor (e.g., processor 120 and/or first communication processor 212 in FIG. 2) of the third electronic device 303 may include the information indicating that the third electronic device 303 does not support EN-DC in the electronic device capability information.

According to various embodiments, the third electronic device 303 may communicate with the first base station 311 in the state of being connected to the first base station 311. According to an embodiment, the third electronic device 303 may receive, at operation 1004, a signal instructing it to add the third base station 331 as a secondary node in the course of communicating with the first base station 311. The first base station 311 may transmit a message including endc-ReleaseAndAdd-r15 set to "true" to instruct the third electronic device 303 to add the third base station 331. If the endc-ReleaseAndAdd-r15 is set to "true", this may mean that the first base station 311 commands the third electronic device 303 to add a cell of the NR network as the secondary cell. That is, the third electronic device 303 may receive a signal instructing addition of the third base station 331 from the first base station 311.

According to various embodiments, the third electronic device 303 may include a single communication processor configured for controlling communications with the MN and the SN in a wireless communication module (e.g., wireless communication module 192 in FIG. 2). According to an alternative embodiment, the third electronic device 303 may include a first communication processor (e.g., first communication processor 212 I FIG. 2) and a second communication processor (e.g., second communication processor 214 in FIG. 2) configured to respectively control communications with the MN and the SN in a wireless communication module (e.g., wireless communication module 192 in FIG. 2). That is, the third electronic device 303 may include the first communication processor 212 for controlling a signal communication between the third electronic device 303 and the master node and the second communication processor 214 for controlling a signal communication between the third electronic device 303 and the secondary node. In this case, the third electronic device 303 that is in communication with the first base station 311 as the master node may receive a secondary node addition command from the first base station 311 as the master node by means of the first communication processor (e.g., first communication processor 212 in FIG. 2) and identify the secondary node addition command. Upon receipt of the secondary node addition command from the first base station 311, the first communication processor 212 may command the second communication processor (e.g., second communication processor 214 in FIG. 2) to establish a connection to the secondary node or send the secondary node addition command to the second communication processor 214.

According to various embodiments, the third electronic device 303 may newly receive, at operation 1004, a first uplink maximum transmit power value (P-Max$_{LTE}$) from the first base station 311 as the master node. The third electronic device may update a previously stored first uplink maximum transmit power value (P-Max$_{LTE}$) with the newly-received first uplink maximum transmit power value (P-Max$_{LTE}$). According to an embodiment, the first communication processor 212 of the third electronic device 303 may update and store the first uplink maximum transmit power value in the memory 130 and send the updated first uplink maximum transmit power value to the second communication processor 214.

According to various embodiments, the third electronic device 303 may determine uplink transmit powers at operation 1008. The uplink transmit powers may include an uplink transmit power for transmission to the first base station 311 as the master node and the uplink transmit power for transmission to the third electronic device 331 as the secondary node. According to an embodiment, if the first uplink maximum transmit power value is newly received at operation 1004, the first communication processor 212 may determine the uplink transmit power for transmission to the first base station 311 based on the newly-received first uplink maximum transmit power value. According to an alternative embodiment, if no first uplink maximum transmit power value is newly received at operation 1004, the first communication processor 212 of the third electronic device 303 may determine the uplink transmit power for transmission to the first base station 311 based on the first uplink maximum transmit power value received at operation 1000.

According to various embodiments, the first communication processor 212 of the third electronic device 303 may determine the uplink transmit power for transmission to the first base station 311 at operation 1008 and send the information on the determined uplink transmit power to the second communication processor 214. According to an embodiment, the second communication processor 214 of the third electronic device 303 may determine a second uplink transmit power based on the first uplink transmit power determined and provided by the first communication processor 212 and/or the first uplink maximum transmit power value and a second uplink maximum transmit power value received from the third base station 331.

According to various embodiments, the third electronic device 303 may communicate, at operation 1010, with the first base station 311 as the master node and/or the third base station 331 as the secondary node based on the determined uplink transmit powers.

FIG. 10B is a flowchart illustrating details of the uplink transmit power determination operation 1008 of FIG. 10A.

According to various embodiments, the second communication processor 214 of the third electronic device 303 may determine, at operation 1020, uplink transmit power in a first time period during which a first uplink for the first base station 311 as the master node and a second uplink for the third base station 331 as the secondary node are not overlapped based on the second uplink maximum transit power value. According to an embodiment, if the first uplink for the first base station 311 as the master node and the second uplink for the third base station 331 as the secondary node are not overlapped in the first time period, the first uplink transmit power for transmission to the first base station 311 may be determined within the range of the maximum allowed transmit power of the third electronic device 303 based on the first uplink maximum transmit power value received at operation 1000 and/or operation 1004. According to an embodiment, the second uplink transmit power for transmission to the third base station 331 as the secondary node during the first time period may be determined within the range of the maximum allowed transmit power of the third electronic device 303 based on the second uplink maximum transmit power value received at operation 1006.

According to various embodiments, the second communication processor 214 of the third electronic device 303 may calculate, at operation 1022, a sum of the first uplink maximum transmit power value and the second uplink maximum transmit power value. Next, the second communication processor 214 of the third electronic device 303 may determine whether the sum of the two values is equal to or less than the maximum allowed transmit power of the third electronic device 303.

According to various embodiments, if it is determined at operation 1024 that the sum of the two values is equal to or less than the maximum allowed transmit power of the third electronic device 303, the procedure goes to operation 1026; if it is determined at operation 1024 that the sum of the two values is greater than the maximum allowed transmit power of the third electronic device 303, the procedure goes to operation 1028.

According to an embodiment, the second communication processor 214 of the third electronic device 303 may determine, at operation 1026, the second uplink transmit power based on the second link maximum transmit power value because the sum of the two values is equal to or less than the maximum allowed transmit power of the third electronic device 303.

According to various embodiments, the second communication processor 214 of the third electronic device 303 cannot determine, at operation 1028, the second uplink transmit power based on the second uplink maximum transmit power value because the sum of the two values is greater than the maximum allowed transmit power of the third electronic device 303. In this case, the second communication processor 214 of the third electronic device 303 may determine the second uplink transmit power such that the sum of the first uplink maximum transmit power value and the second uplink maximum transmit power falls short of the maximum allowed transmit power of the third electronic device 303.

According to an embodiment, the second communication processor 214 of the third electronic device 303 may determine, at operation 1028, the second uplink transmit power value within the range obtained by subtracting the first uplink transmit power value from the maximum allowed transmit power of the third electronic device 303.

As described above, the transmit power control apparatus and method disclosed in the various embodiments is advantageous in terms of allowing an electronic device to manage its transit power efficiently. The transmit power control apparatus and method disclosed in the various embodiments is also advantageous in terms of allowing an electronic device, even after the electronic device has reported to a base station that it does not support MR-DC, to perform simultaneous transmission appropriately to base stations supporting different radio access technologies in an MR-DC environment. The transmit power control apparatus and method disclosed in the various embodiments is also advantageous in terms of allowing an electronic device to access networks supporting different radio access technologies in a transmit power efficiency-adaptive manner in an MR-DC environment.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A transmit power control method of an electronic device connected to a master node via a first radio access technology (RAT) and a secondary node via a second RAT for communication in a multi-RAT dual connectivity (MR-DC) environment, the method comprising:
receiving a first uplink maximum transmit power value allowed for transmission to the master node from the master node and storing the first uplink maximum transmit power value;
generating and transmitting electronic device capability information in response to an electronic device capability information inquiry received from the master node, the electronic device capability information comprising information indicating whether the electronic device supports MR-DC and information indicating whether the electronic device supports dynamic power sharing in the MR-DC environment;
receiving a secondary node addition command message from the master node in a state of being connected to the master node;
receiving a second uplink maximum transmit power value allowed for the secondary node from the secondary node in the state of being connected to the master node and storing the second uplink maximum transmit power; and
in a case of communicating with the master and secondary nodes:
determining a first transmit power for transmission over the second uplink based on the second uplink maximum transmit power value in a first time period which a duration for uplink data transmission to the master node and a duration for uplink data transmission to the secondary node are not overlapped, and
determining a second transmit power for transmission over the second uplink based on the second uplink maximum transmit power value in a second time period which at least part of the duration for uplink data transmission to the master node and the duration for uplink data transmission to the secondary node are overlapped, in case that a sum of the first and second uplink maximum transmit power values is equal to or less than a maximum allowed uplink transmit power value of the electronic device.

2. The method of claim 1, wherein the information indicating whether the electronic device supports the MR-DC indicates that the electronic device supports the MR-DC.

3. The method of claim 1, wherein the information indicating whether the electronic device supports the MR-DC indicates that the electronic device does not support the MR-DC.

4. The method of claim 1, further comprising:
determining the second uplink transmit power within a range of a value obtained by subtracting the first uplink maximum transmit power value from the maximum allowed uplink transmit power value of the electronic device in the second time period, in case that the sum of the first and second uplink maximum transmit power values is greater than the maximum allowed uplink transmit power value of the electronic device.

5. The method of claim 1, further comprising:
updating the first uplink maximum transmit power value based on the first uplink maximum transmit power value being newly received along with the secondary node addition command message; and
determining the first and second transmit powers based on the updated first uplink maximum transmit power value.

6. The method of claim 5, further comprising:
calculating a sum of the updated first uplink maximum transmit power value and the second uplink maximum transmit power value based on a first uplink maximum transmit power value update message being received from the master node; and
transmitting data over uplinks to the master and secondary nodes during the second time period based on the sum of the updated first uplink maximum transmit power value and the second uplink maximum transmit power value being equal to or less than the maximum allowed uplink transmit power value of the electronic device.

7. The method of claim 5, further comprising:
determining the second uplink transmit power within a range of a value obtained by subtracting the updated first uplink maximum transmit power value from the maximum allowed uplink transmit power value of the electronic device for transmission during the second time period based on the sum of the updated first uplink maximum transmit power value and the second uplink maximum transmit power value being greater than the maximum allowed uplink transmit power of the electronic device during the second time period.

8. The method of claim 1, wherein the electronic device communicates with the master node in a frequency division duplexing (FDD) mode.

9. The method of claim 1, wherein the electronic device communicates with the master node in a time division duplexing (TDD) mode.

10. An electronic device, comprising:
a housing;
at least one radio frequency integrated circuit (RFIC) arranged in the housing and configured to support a first radio access technology (RAT) and a second RAT;
a first communication processor electrically or functionally connected to the at least one RFIC;
a second communication processor electrically or functionally connected to the at least one RFIC and the first communication processor; and
a memory,
wherein instructions in the memory are executed, while the electronic device is connected to a master node in a multi-RAT dual connectivity (MR-DC) environment, the first communication processor configured to:
store a first uplink maximum transmit power value allowed for transmission to the master node in the memory from the master node,
generate and transmit electronic device capability information in response to an electronic device capability information inquiry received from the master node, the electronic device capability information comprising information indicating whether the electronic device supports MR-DC and information indicating whether the electronic device supports dynamic power sharing in the MR-DC environment,
receive a secondary node addition command message from the master node in a state of being connected to the master node,
instruct the second communication processor to establish a connection to a secondary node via the second RAT upon receipt of the secondary node addition command message,
determine a first transmit power value of the at least one RFIC in association with the first RAT based on the first uplink maximum transmit power, and
provide the first transmit power value of the at least one RFIC that is determined in association with the first RAT to the second communicating processor, and
the second communication processor configured to:
receive a second uplink maximum transmit power value allowed for transmission to the secondary node from the secondary node and store the second uplink maximum transmit power value in the memory, and
establish a connection to the secondary node in response to the secondary node addition command message from the master node,
in a case of transmitting uplink data to the secondary node, the second communication processor further configured to:
determine a first transmit power for transmission over the second uplink based on the second uplink maximum transmit power value in a first time period which a duration for uplink data transmission to the master node and a duration for uplink data transmission to the secondary node are not overlapped, and
determine a second transmit power for transmission over the second uplink based on the second uplink maximum transmit power value in a second time period which at least part of the duration for uplink data transmission to the master node and the duration for uplink data transmission to the secondary node are overlapped, in case that a sum of the first and second uplink maximum transmit power values is equal to or less than a maximum allowed uplink transmit power value of the electronic device.

11. The electronic device of claim 10, wherein the information indicating whether the electronic device supports the MR-DC indicates that the electronic device supports the MR-DC.

12. The electronic device of claim 10, wherein the information indicating whether the electronic device supports the MR-DC indicates that the electronic device does not support the MR-DC.

13. The electronic device of claim 10, wherein the first communication processor further configured to:
determine the second uplink transmit power within a range of a value obtained by subtracting the first uplink maximum transmit power value from the maximum allowed uplink transmit power value of the electronic device in the second time period, in case that the sum of the first and second uplink maximum transmit power values is greater than the maximum allowed uplink transmit power value of the electronic device.

14. The electronic device of claim 10, wherein the first communication processor further configured to:
update the first uplink maximum transmit power value based on the first uplink maximum transmit power value being newly received along with the secondary node addition command message from the master node and provide the updated first uplink maximum transmit power value to the second communication processor and wherein the second communication processor further configured to:
receive the updated first uplink maximum transmit power value and determine the second transmit power based on the updated first uplink maximum transmit power value.

15. The electronic device of claim 14, wherein the second communication processor further configured to determine the second uplink transmit power within a range of a value obtained by subtracting the updated first uplink maximum transmit power value from the maximum allowed uplink transmit power value of the electronic device for transmission during the second time period based on the sum of the updated first uplink maximum transmit power value and the second uplink maximum transmit power value being greater than the maximum allowed uplink transmit power of the electronic device during the second time period.

16. The electronic device of claim 10, wherein the electronic device communicates with the master node in a frequency division duplexing (FDD) mode.

17. The electronic device of claim 10, wherein the electronic device communicates with the master node in a time division duplexing (TDD) mode.

18. A method for a base station as a master node of an electronic device in an evolved universal terrestrial radio access (E-UTRA) new radio (NR) dual connectivity (EN-DC) environment to communicate with the electronic device via a first radio access technology (RAT) in a first band, the method comprising:
performing a random access procedure with the electronic device;
inquiring about and receiving electronic device capability information from the electronic device;
determining whether to add a secondary node supporting communication with the electronic device via a second RAT in a second band that is different from the first band; and
transmitting an updated power allocation value to the electronic device along with a secondary node addition command based on the electronic device capability information indicating that the electronic device does not support dynamic power sharing, the updated power allocation value being set based on the electronic device capability information and uplink power information for transmission to the second node.

19. The method of claim 18, further comprising transmitting a control message including electronic device information and information on an uplink power limit of the secondary node.

20. The method of claim 18, wherein the updated power allocation value is transmitted using a radio resource control (RRC) connection reconfiguration message.

* * * * *